(12) United States Patent
Thompson et al.

(10) Patent No.: US 11,503,777 B2
(45) Date of Patent: Nov. 22, 2022

(54) PLANT COVER DEVICE WITH UPPER END AND LOWER TUBULAR END AND RELATED METHODS

(71) Applicant: Tree Defender, LLC, Dundee, FL (US)

(72) Inventors: Scott K. Thompson, Winter Haven, FL (US); Thomas A. Thayer, Jr., Winter Haven, FL (US)

(73) Assignee: TREE DEFENDER, LLC, Dundee, FL (US)

( * ) Notice: Subject to any disclaimer, the term of this patent is extended or adjusted under 35 U.S.C. 154(b) by 276 days.

(21) Appl. No.: 16/750,271

(22) Filed: Jan. 23, 2020

(65) Prior Publication Data

US 2020/0154650 A1 May 21, 2020

Related U.S. Application Data

(63) Continuation-in-part of application No. PCT/US2018/046166, filed on Aug. 10, 2018, and a
(Continued)

(51) Int. Cl.
*A01G 13/04* (2006.01)
(52) U.S. Cl.
CPC ...... *A01G 13/043* (2013.01); *A01G 2013/046* (2013.01)
(58) Field of Classification Search
CPC ...... A01G 13/04; A01G 13/10; A01G 13/043; A01G 2013/046
(Continued)

(56) References Cited

U.S. PATENT DOCUMENTS

| 133,099 A | 11/1872 | Miller |
| 614,921 A | 11/1898 | Zimmerman |

(Continued)

FOREIGN PATENT DOCUMENTS

| DE | 9418837 | 4/1955 | | |
| DE | 202004015005 U1 * | 2/2005 | ............. | A45B 25/00 |

(Continued)

OTHER PUBLICATIONS

Chris Thiele "How different coloors of light affect plant growth" https://www.grobo.io/blogs/grobo/how-different-colors-of-light-affect-plant-growth; May 29, 2018 pp. 8.
(Continued)

*Primary Examiner* — Ebony E Evans
(74) *Attorney, Agent, or Firm* — Allen, Dyer, Doppelt + Gilchrist, PA

(57) ABSTRACT

A plant cover device may include an enclosure having an upper end, a lower tubular end opposite the upper end, and a medial seam coupling the upper end and the lower tubular end. The upper end may include panels coupled together to partially define a plant-receiving cavity therein. Each of the panels may have a major mesh surface, and a panel seam extending along a peripheral edge of the major mesh surface, adjacent panels being coupled together at respective panel seams. The lower tubular end may include a major mesh surface and having a first end and a second end opposite the first end, the first end being coupled to the medial seam. The lower tubular end may also partially define the plant-receiving cavity therein. The enclosure may have a curved flexible support carried by the medial seam, and a pole extending vertically from a surface to an apex of the enclosure.

20 Claims, 33 Drawing Sheets

Related U.S. Application Data continuation-in-part of application No. 15/359,111, filed on Nov. 22, 2016, now Pat. No. 11,122,752.

(60) Provisional application No. 62/795,864, filed on Jan. 23, 2019, provisional application No. 62/543,567, filed on Aug. 10, 2017, provisional application No. 62/259,188, filed on Nov. 24, 2015.

(58) Field of Classification Search
USPC .................................. 47/20.1, 29.1, 29.5, 31
See application file for complete search history.

(56) References Cited

U.S. PATENT DOCUMENTS

| | | | |
|---|---|---|---|
| 633,528 A | 9/1899 | Morris | |
| 1,446,416 A | 2/1923 | Curtiss | |
| 2,006,562 A | 7/1935 | Scheu | |
| 2,097,929 A | 11/1937 | Lovett, Jr. | |
| 2,781,811 A | 2/1957 | Dilar | |
| 2,943,634 A * | 7/1960 | Morgan | E04H 15/003 135/96 |
| 3,419,024 A * | 12/1968 | Nickerson, Jr. | E04H 1/1244 135/98 |
| 3,441,037 A * | 4/1969 | Transeau | E04H 15/003 135/97 |
| 3,477,453 A * | 11/1969 | Ulisse | E06B 9/52 135/95 |
| 3,490,469 A * | 1/1970 | Dubinsky | A45B 25/24 135/34.2 |
| 3,860,022 A * | 1/1975 | Arndt | A47C 29/006 135/98 |
| 3,899,168 A * | 8/1975 | Besherse | A63J 19/00 472/75 |
| 4,054,166 A | 10/1977 | Burke | |
| 4,341,039 A | 7/1982 | Reese | |
| 4,384,604 A | 5/1983 | DeLaura et al. | |
| 4,646,467 A | 3/1987 | Morrisroe | |
| 4,787,173 A | 11/1988 | Lewis | |
| 4,799,520 A | 1/1989 | Blackburn et al. | |
| 4,969,555 A | 11/1990 | Fitzgerald | |
| 5,016,388 A | 5/1991 | Burress et al. | |
| 5,172,712 A * | 12/1992 | Robinson | A45B 25/18 135/33.41 |
| 5,224,967 A | 7/1993 | Rolf et al. | |
| 5,233,788 A | 8/1993 | Jackson, Jr. | |
| 5,259,408 A * | 11/1993 | Guerin | A47C 29/006 135/147 |
| 5,291,999 A | 3/1994 | Phair | |
| 5,359,810 A | 11/1994 | Aul | |
| 5,456,043 A | 10/1995 | Dacon, Sr. | |
| 5,582,115 A * | 12/1996 | Muller | A47C 7/66 108/90 |
| 5,590,775 A | 1/1997 | Moore | |
| 5,664,595 A * | 9/1997 | Vonderhorst | A45B 3/00 135/15.1 |
| 6,088,953 A | 7/2000 | Morgan | |
| 6,698,135 B1 | 3/2004 | Robbins | |
| 6,698,440 B2 * | 3/2004 | Beyer | A45B 23/00 135/25.41 |
| D499,880 S * | 12/2004 | Wright | D3/5 |
| 7,047,992 B1 * | 5/2006 | Fluellen | E04H 12/2223 135/136 |
| 7,497,048 B2 | 3/2009 | Bakowski | |
| 7,866,089 B2 | 1/2011 | Iwig et al. | |
| D655,774 S * | 3/2012 | Novak | D21/839 |
| 9,215,945 B2 | 12/2015 | PeCoy | |
| 9,603,423 B1 * | 3/2017 | Skobeleva | A45F 3/52 |
| D787,283 S | 5/2017 | Horvath | |
| 9,814,188 B2 | 11/2017 | Almudhyan | |
| 2001/0051240 A1 | 12/2001 | Denis | |
| 2003/0009936 A1 | 1/2003 | Hodson | |
| 2005/0172548 A1 | 8/2005 | Bement | |
| 2006/0059775 A1 | 3/2006 | L'Estrange | |
| 2007/0062171 A1 | 3/2007 | Roberts | |
| 2007/0079548 A1 | 4/2007 | Bakowski | |
| 2007/0186466 A1 | 8/2007 | Gardiner | |
| 2010/0170818 A1 | 7/2010 | Lin | |
| 2010/0172601 A1 | 7/2010 | Lin | |
| 2011/0314731 A1 | 12/2011 | Toye | |
| 2013/0219783 A1 | 8/2013 | Toye | |
| 2013/0239472 A1 | 9/2013 | Toye | |
| 2014/0196364 A1 | 7/2014 | Mayner | |
| 2018/0007980 A1 * | 1/2018 | Butler | A41D 1/215 |

FOREIGN PATENT DOCUMENTS

| | | |
|---|---|---|
| GB | 1242580 | 8/1971 |
| GB | 2098247 | 11/1982 |
| GB | 2420262 | 5/2006 |
| JP | H11225591 | 8/1999 |
| WO | WO03096791 | 11/2003 |

OTHER PUBLICATIONS

Klein et al. "Effects of Near Ultraviolet and Green Radiations on Plant Growth" Plant Physiology' Mar. 29, 1965; pp. 4.

* cited by examiner

PLANT COVER DEVICE WITH UPPER END AND LOWER TUBULAR END AND RELATED METHODS

RELATED APPLICATION

This application is based upon prior filed Application No. 62/795,864 filed Jan. 23, 2019, is a continuation-in-part of copending application Ser. No. 15/359,111 filed Nov. 22, 2016, which claims priority to Application No. 62/259,188 filed Nov. 24, 2015, and is a continuation-in-part of Application No. PCT/US2018/046166 filed Aug. 10, 2018, which claim priority to Application No. 62/543,567 filed Aug. 10, 2017, the entire subject matter of these applications is incorporated herein by reference in its entirety.

TECHNICAL FIELD

The present disclosure relates to the field of agricultural devices, and, more particularly, to disease prevention device and related methods.

BACKGROUND

The agricultural industry is a large and robust industry worldwide. To meet worldwide demand for agricultural products, producers utilize numerous methods to maximize production in agricultural crops. For example, one technique includes removing unwanted growth (i.e. soil cultivation) around the base of crops to enhance growth and production. Typically, this is accomplished with the application of herbicide around the base of most crops.

Although there are effective herbicides, there are several drawbacks to their use. Firstly, the adaptation of herbicide resistant "super weeds" has reduced the effectiveness of many herbicides. Secondly, herbicides cannot be applied toward organic fields or directly over non-GMO crops. Thirdly, the application of herbicides may weaken the crop's natural defense, and application to crops prior to harvest may result in crop damage when contacted by spray drift or when absorbed from the soil by the plant's root system.

Another technique is implementation of a robust fertilization program. Although fertilization programs do enhance growth of crops, they can be costly to implement and maintain. Moreover, herbicides cannot be applied toward organic fields or directly over non-GMO crops.

Yet another technique is a robust insecticide program. Of course, this programs provides benefits from evasive insects that harm the crop. Another benefit is the insecticide program may help prevent infection of the crop from disease, such as fungus and bacterial infections.

One example disease is citrus greening, also known as Huanglongbing (HLB) or yellow dragon disease. Citrus greening disease is one of the most serious citrus plant diseases in the world because there is currently no cure. The disease has devastated millions of acres of citrus crops throughout the United States and abroad. Citrus greening disease is spread by a disease-infected insect, the Asian citrus psyllid The infected insect spreads the disease as it feeds on the leaves and stems of citrus trees. Citrus greening disease is further spread by moving infected plants and plant materials.

The disease has affected the entire US citrus industry, and has been reported in 33 nations worldwide. Infected citrus trees produce fruits that are green, misshapen and bitter, unsuitable for sale as fresh fruit or for juice. Most infected trees die within a few years and have few productive years, if any.

Citrus greening disease is typically managed using insecticides to control the psyllid population. Evidence shows that reducing psyllid populations via insecticide application not only slows the rate of citrus greening disease spread but also reduces severity of the disease once established.

Young trees that produce multiple flushes throughout the year are at greater risk of greening infection than mature trees because of the attraction of adult psyllids to the new flush. Even without the disease, young trees need to be protected for about four years from psyllids and leaf miners to grow optimally. In some approaches, soil-applied systemic insecticides provide long lasting control of psyllids, but the chemicals may be environmentally harmful.

In other approaches, tree covers that enclose a tree to prevent insect infiltration are deployed. These tree cover approaches, however, may suffer from one or more drawbacks. The tree cover may rest its weight against the tree, which can damage foliage and branches of young trees. In some approaches, the tree covers may have a Skelton-like framework that prevents the cover from resting against the foliage, but the framework may provide for a more complicated install.

SUMMARY

Generally, a plant cover device may include an enclosure comprising an upper end, a lower tubular end opposite the upper end, and a medial seam coupling the upper end and the lower tubular end. The upper end may comprise a plurality of panels coupled together to partially define a plant-receiving cavity therein. Each of the plurality of panels may have a major mesh surface, and a panel seam extending along a peripheral edge of the major mesh surface, adjacent panels being coupled together at respective panel seams. The lower tubular end may include a major mesh surface and having a first end and a second end opposite the first end, the first end being coupled to the medial seam. The lower tubular end may also partially define the plant-receiving cavity therein. The enclosure may comprise a curved flexible support carried by the medial seam, and a pole extending vertically from a surface to an apex of the enclosure.

More specifically, each of the plurality of panels may comprise a pentagon-shaped panel. Each of the plurality of panels may comprise a triangle-shaped section, and a rectangle shaped section coupled to the triangle-shaped section. The respective triangle-shaped sections of the plurality of panels may define the apex of the enclosure and an uppermost portion of the plant-receiving cavity.

In some embodiments, the second end of the lower tubular end may comprise a solid section at a lowermost end of the lower tubular end. The solid section may be opaque to visible light radiation and waterproof. The second end of the lower tubular end may comprise a drawstring coupled at a lowermost end of the lower tubular end. The curved flexible support may comprise a loop-shaped support, for example. The curved flexible support may comprise a single piece flexible rod. The medial seam may comprise an annular sleeve, and the curved flexible support may be carried within the annular sleeve. For example, each mesh surface may comprise a plurality of mesh openings, each opening having a diameter of less than 300 µm.

Another aspect is directed to a method of making a plant cover device. The method may include forming an enclosure comprising an upper end, a lower tubular end opposite the upper end, and a medial seam coupling the upper end and the lower tubular end. The upper end may include a plurality of panels coupled together to partially define a plant-receiving cavity therein. Each of the plurality of panels may have a major mesh surface, and a panel seam extending along a peripheral edge of the major mesh surface. Adjacent panels may be coupled together at respective panel seams. The lower tubular end may comprise a major mesh surface and have a first end and a second end opposite the first end, the first end being coupled to the medial seam. The lower tubular end may also partially define the plant-receiving cavity therein. The enclosure may comprise a curved flexible support carried by the medial seam. The method may comprise providing a pole to extend vertically from a surface to an apex of the enclosure.

DETAILED DESCRIPTION

Figure 1:
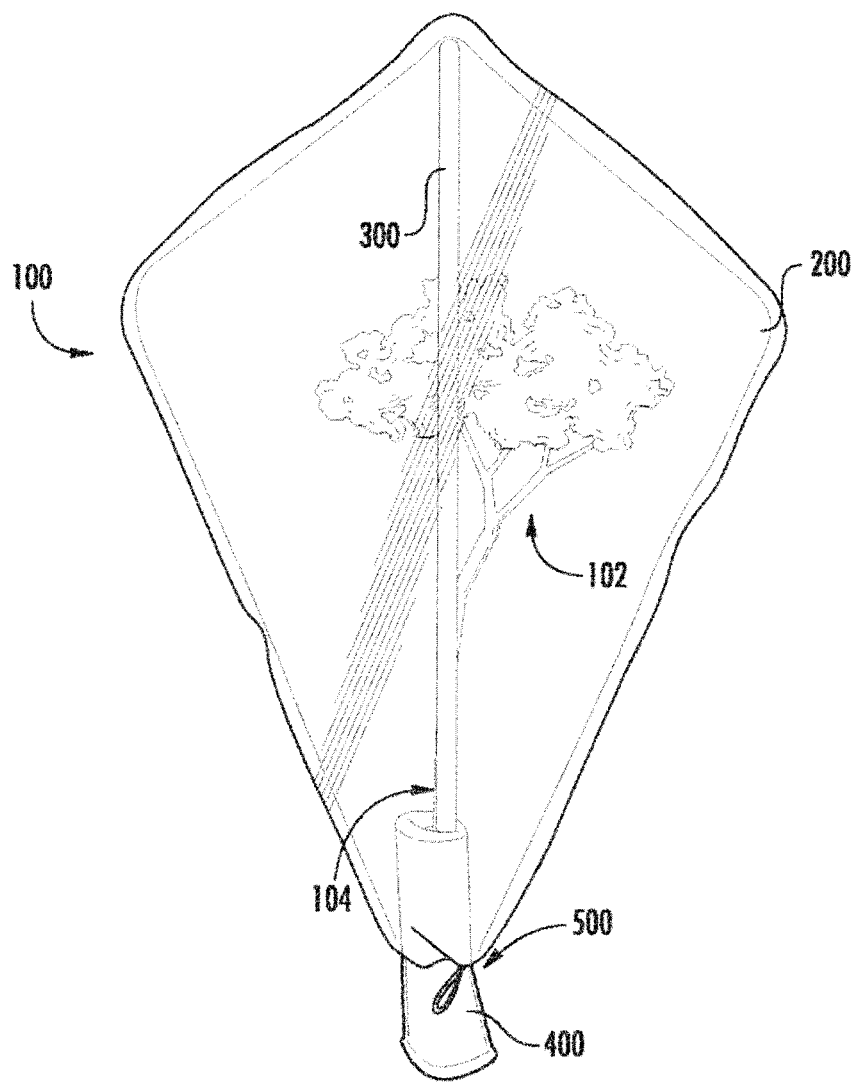
FIG. 1 is a perspective view of a first example of the plant cover system installed so as to enclose a young tree.
Figure 2:
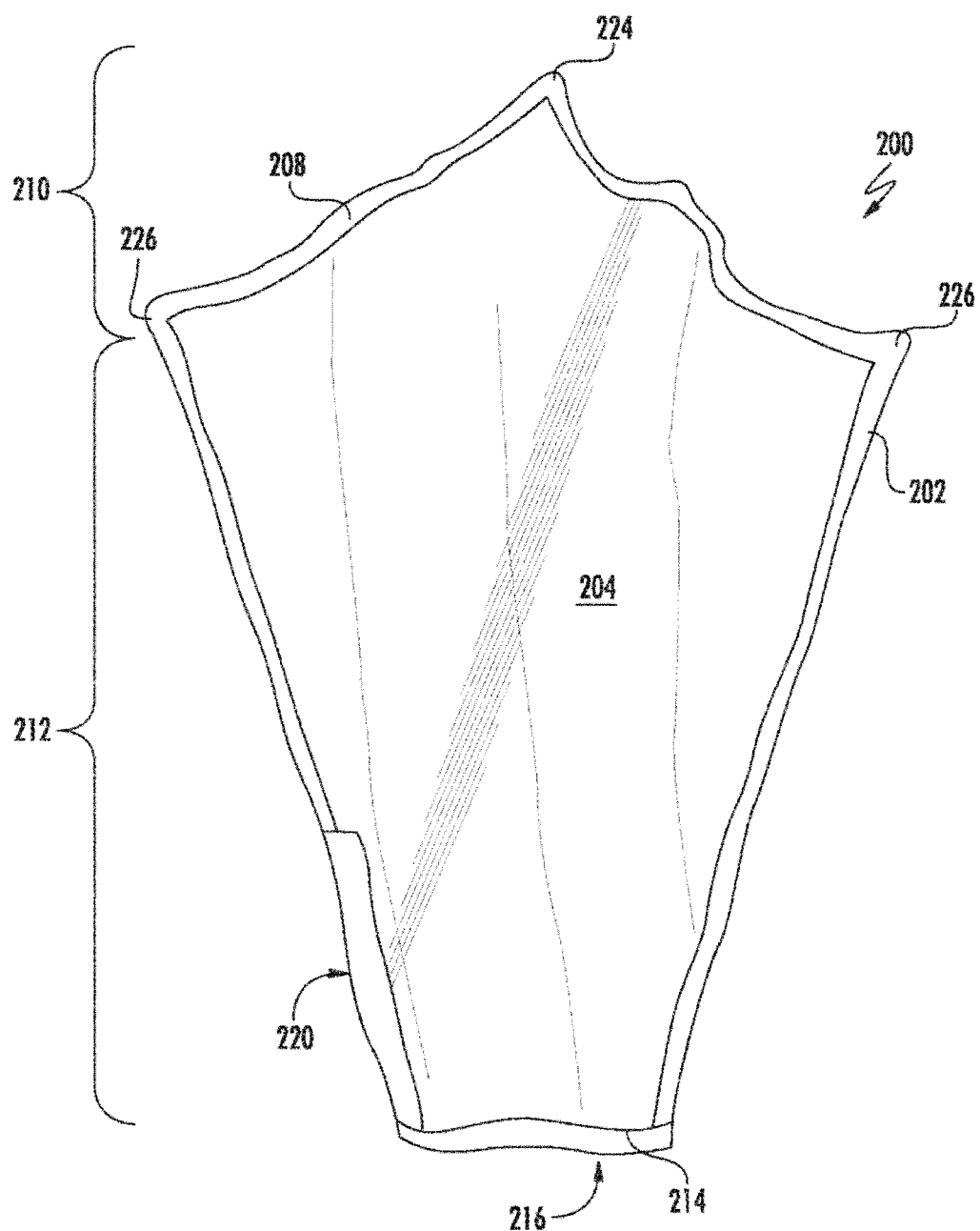
FIG. 2 is a front view of an example of the plant cover bag.
Figure 3:
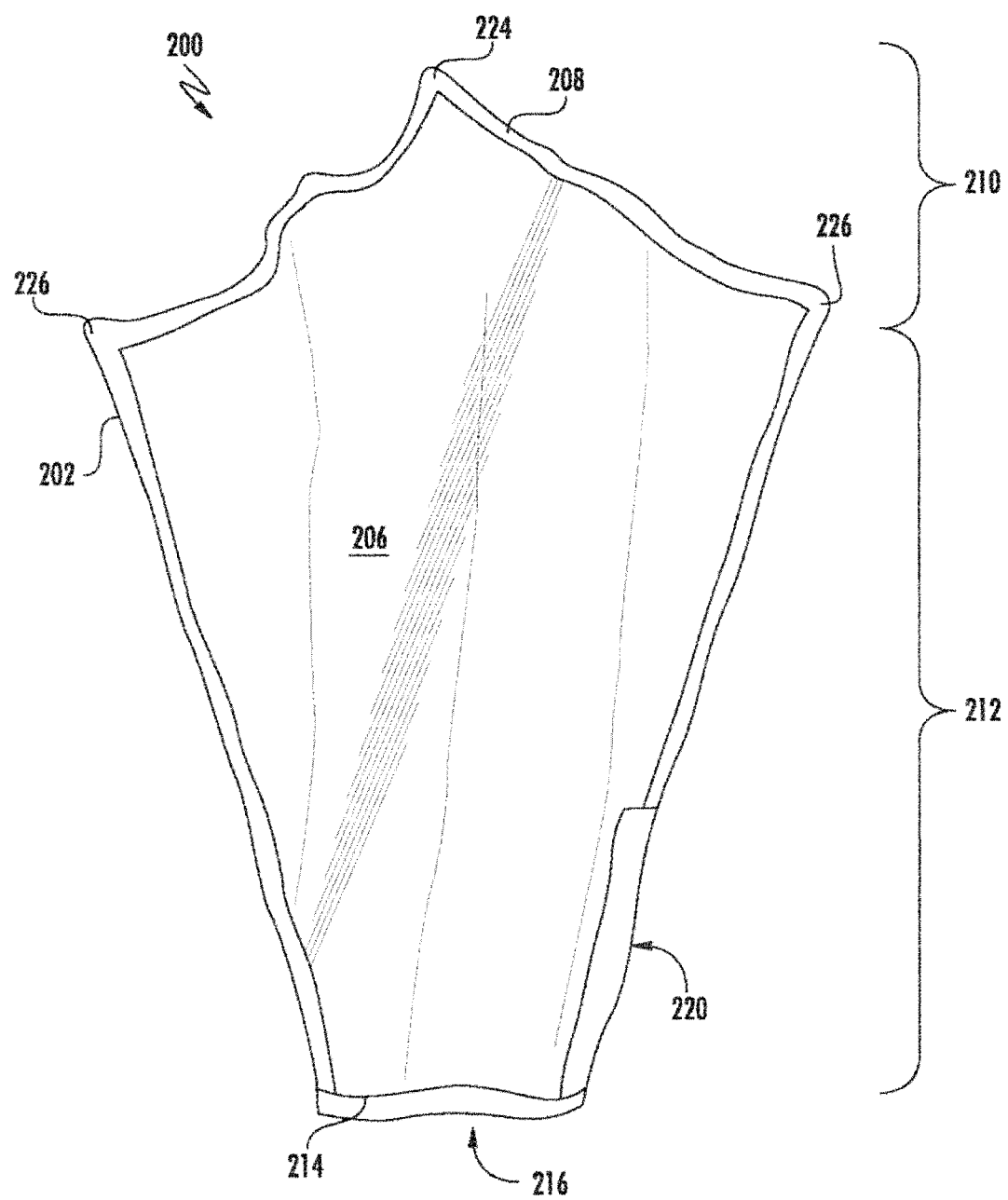
FIG. 3 is a back view thereof.
Figure 4:
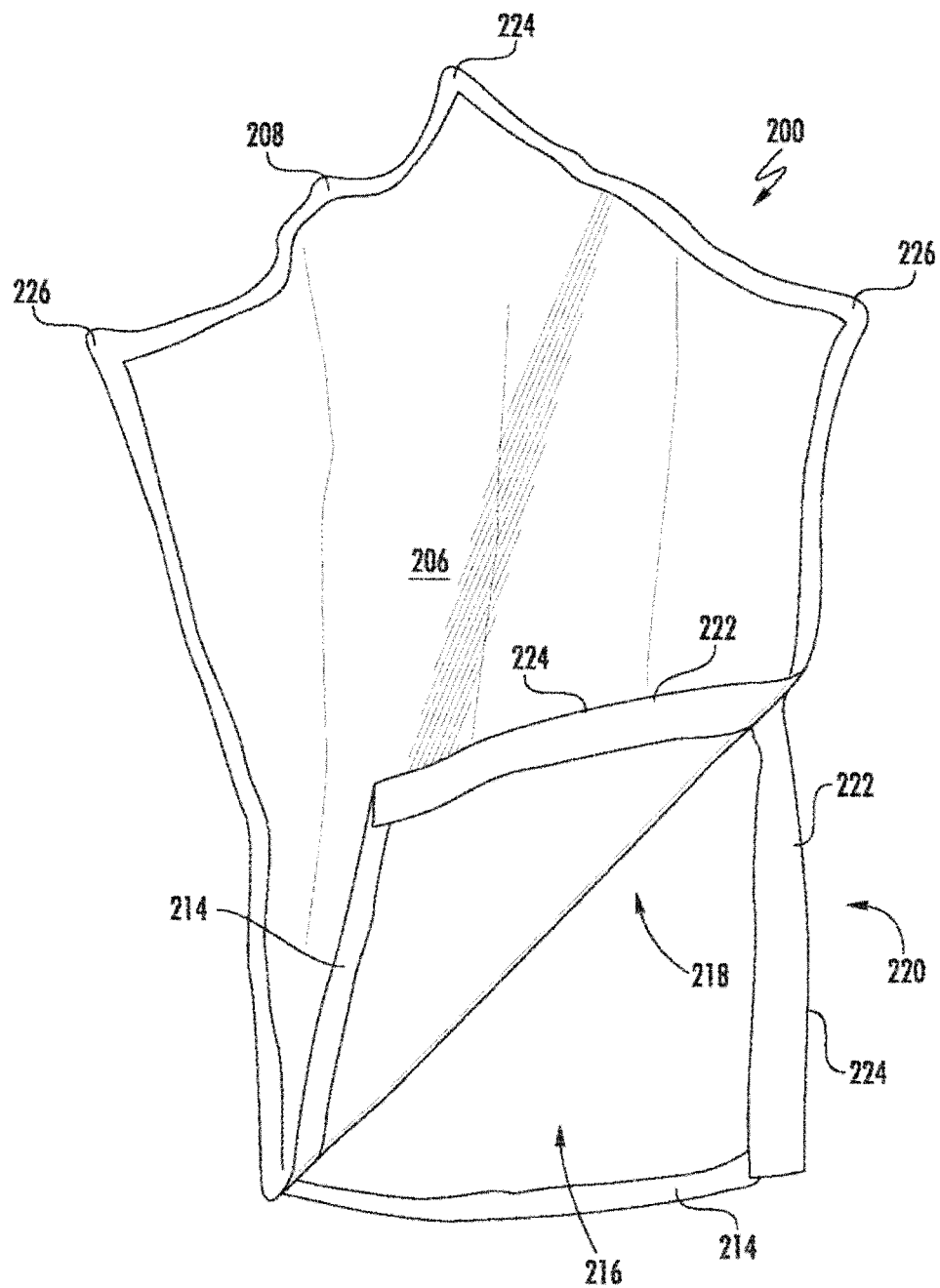
FIG. 4 is another back view of the plant cover bag showing the margins separated to increase the size of the opening.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout; prime notation is used to indicate similar elements in alternative embodiments; and base 100 reference numerals are used to indicate similar elements in alternative embodiments.

Young citrus trees are at greater risk than mature trees of infection because of frequent leaf flush (fresh growth) which attracts the psyllid as well as many other pests as the young tree grows. The plant cover system described here may advantageously be used to protect young citrus trees for the first three years and beyond after planting. However, it should be recognized that the cover can also be used on a wide variety, size, and age of fruit trees, ornamentals, vegetables, and the like. It is to be understood that the term "plant" as used herein may include trees. For example, "a plant cover" refers to a cover for trees and other plants.

Referring to FIG. 1, a first example embodiment of the plant cover system 100 includes a plant cover bag 200 upwardly supported by a vertical support member 300 over a tree 102. The bottom of the bag 200 is closed around the trunk 104 of the tree 102. An optional trunk cover 400 encircles the trunk. A closure 500 closes the bottom of the bag 200 around the trunk 104.

Additional details of the bag 200 are now described with reference to FIGS. 2-6. The bag 200 has a generally kite shaped exterior perimeter 202 and is formed from a first kite shaped panel 204 and a second kite shaped panel that are joined together along a seam 208 forming the exterior perimeter 202 by a conventional joining mechanism such as using an adhesive, sewing, stapling, or the like.

The seam 208 adds rigidity to the exterior perimeter 202, allowing the exterior perimeter 202 to maintain its kite shape without a separate support frame when suspended over a tree. This allows the midsection of the bag 200 to bulge out around the tree's foliage so that the bag 200 does not rest its weight against the foliage.

An upper section 210 of the bag 200 is generally triangle shaped. A lower section 212 of the bag 200 is generally trapezoid shaped. A bottom end of the bag 200 includes a rim 214 that circumscribes an opening 216 to the bag's interior 218.

A slot 220 interrupts the seam 208, extends vertically from the opening 216, and includes a pair of opposed margins 222 that include cooperatively interlocking parts 224 that can temporarily be joined and separated to increase the size of the opening when installing over a plant. The interlocking joining mechanism for the margins 222 may be a hook and loop type closure such as hook and loop interface, a zipper, or the like. The entire length of the slot 220 may be completely closed to prevent insects from entering through the slot 220.

Figure 5:
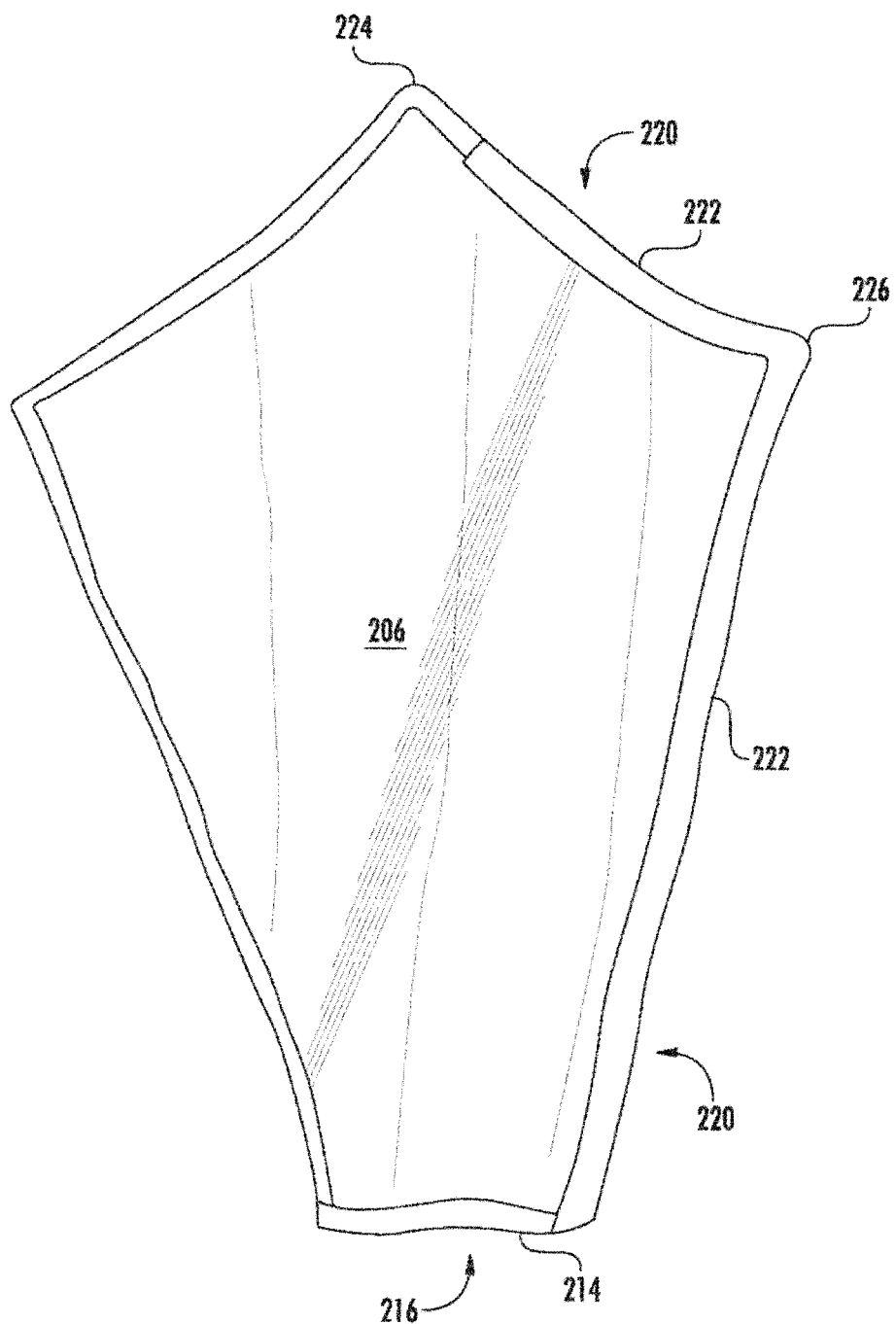
FIG. 5 is a back view of another example of the plant cover bag with a slot that extends to the upper section of the bag.
Figure 6:
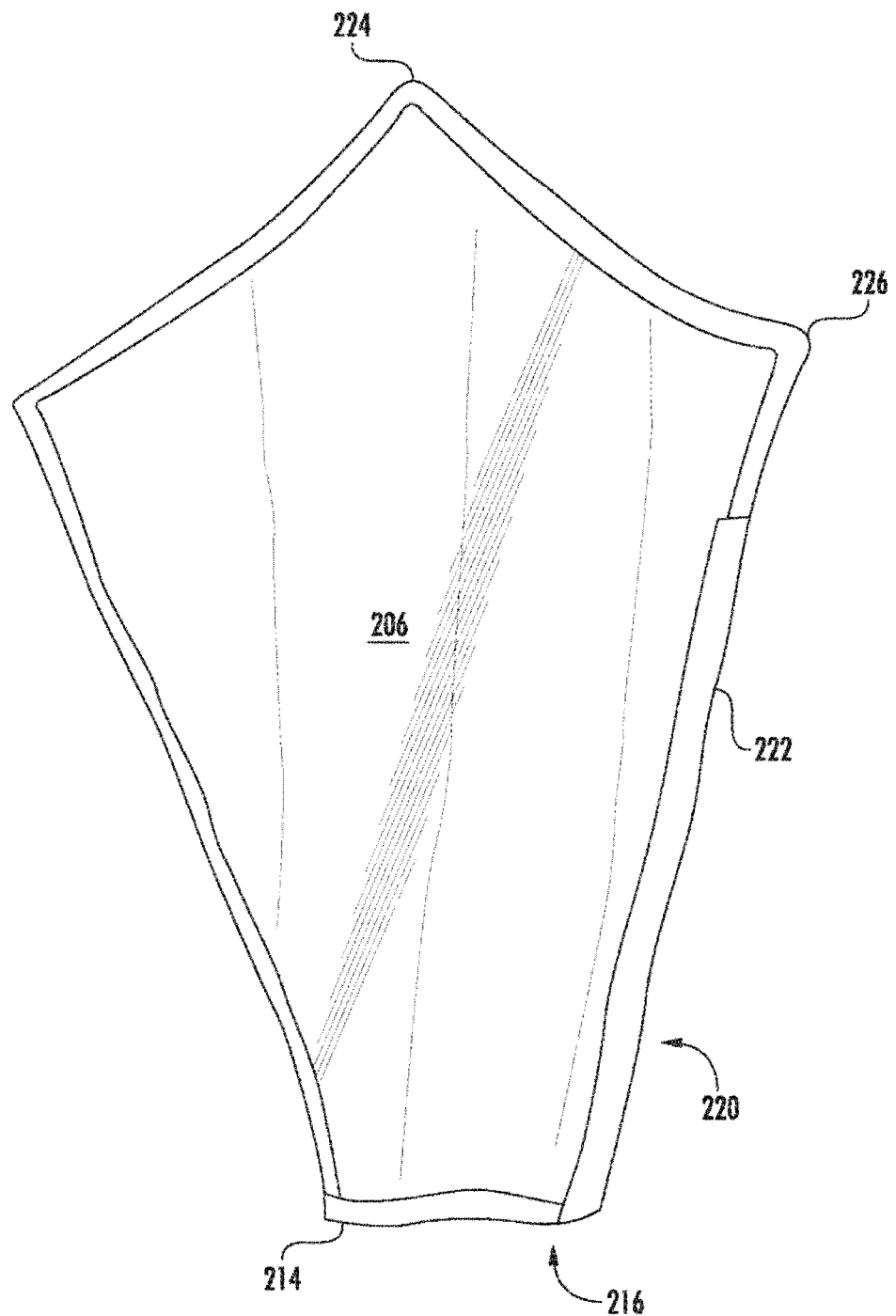
FIG. 6 is a back view of another example of the plant cover bag with a slot that extends closer to the side apex than in the first example.
Figure 7:
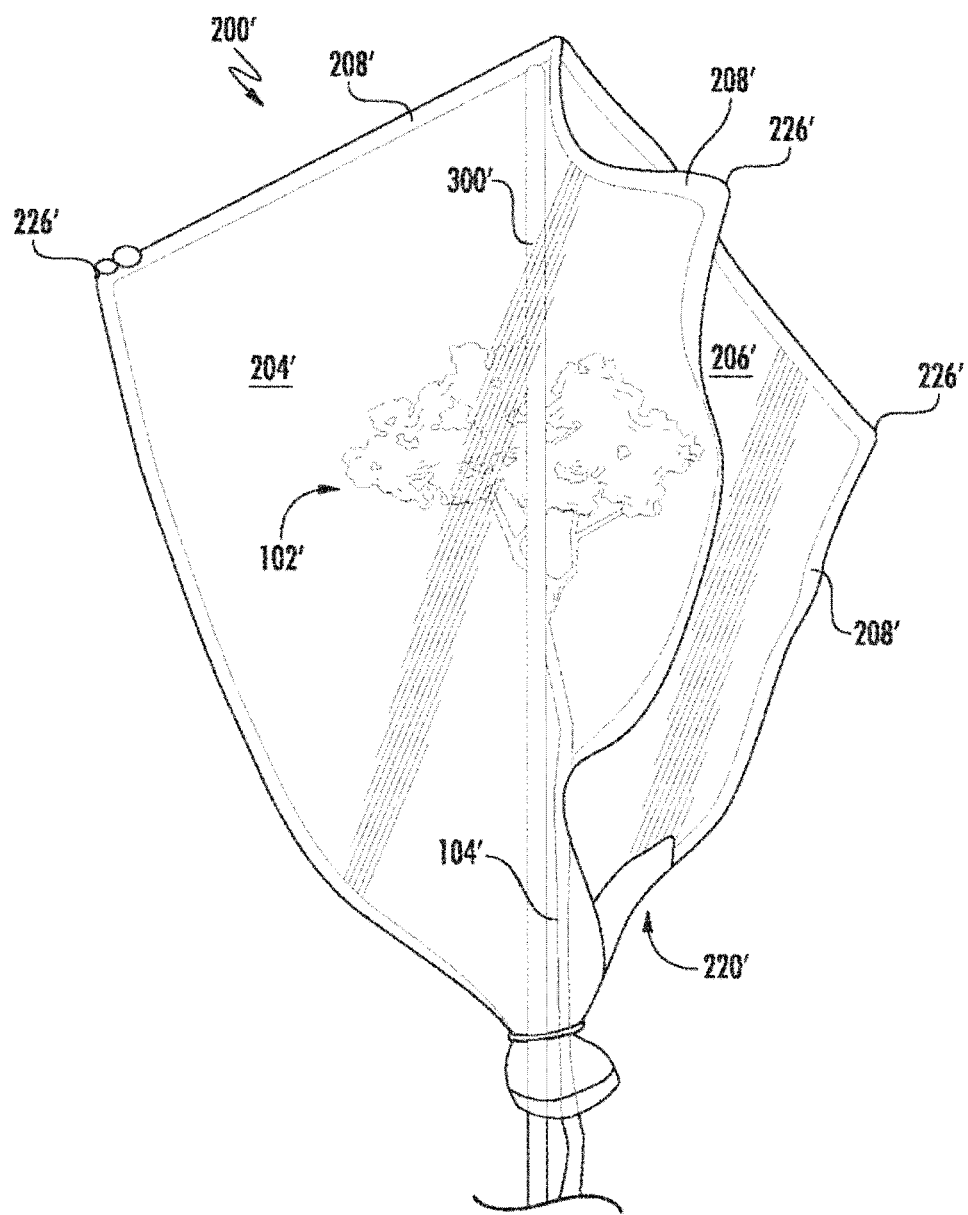
FIG. 7 is a perspective view of a second example of the plant cover system installed so as to enclose a young tree.

Referring to FIGS. 5 & 6, the length of the slot 220 may vary among different examples to accommodate different sizes and shapes of plants and trees. In the example of FIG. 6, the slot 220 extends from the opening 216 to the upper section 210 of the bag 200 and terminates before reaching the bag's top apex 224. In the example of FIG. 7, the slot 220 extends from the opening 216 and part of the way to the side apex 226. If the plant being covered is a fruit or vegetable plant, the extended slot 220 can be opened to harvest the fruits or vegetables from the plant and then closed.

The panels 204, 206 form a wall that encloses the interior of the bag 200. The panels 204, 206 may be made at least partially or completely of a mesh material, which provides water permeability and light transmissivity, but prevents intrusion by small insects such as psyllids. The mesh size may be, for example, 50 mesh or 50 by 25 threads per square inch. Such a mesh size will be sufficient to prevent intrusion by psyllids, aphids, white flys, mealy bugs, leaf miners, thrips, grasshoppers, ants, and orange dogs. The bag 200 may also protect the enclosed foliage from frost, hail, and wind damage.

Figure 8:
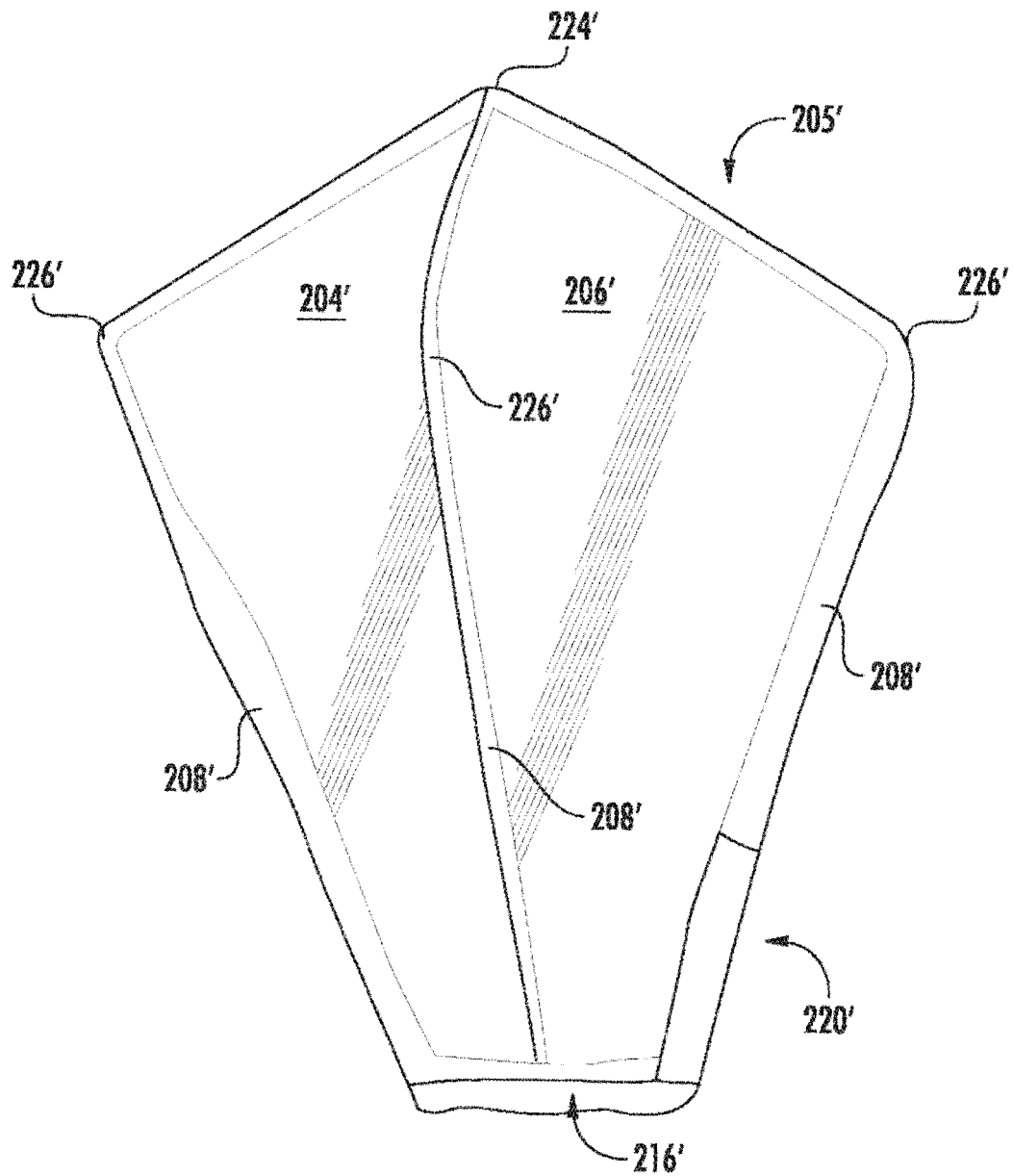
FIG. 8 is a front view of the bag in the second example.
Figure 9:
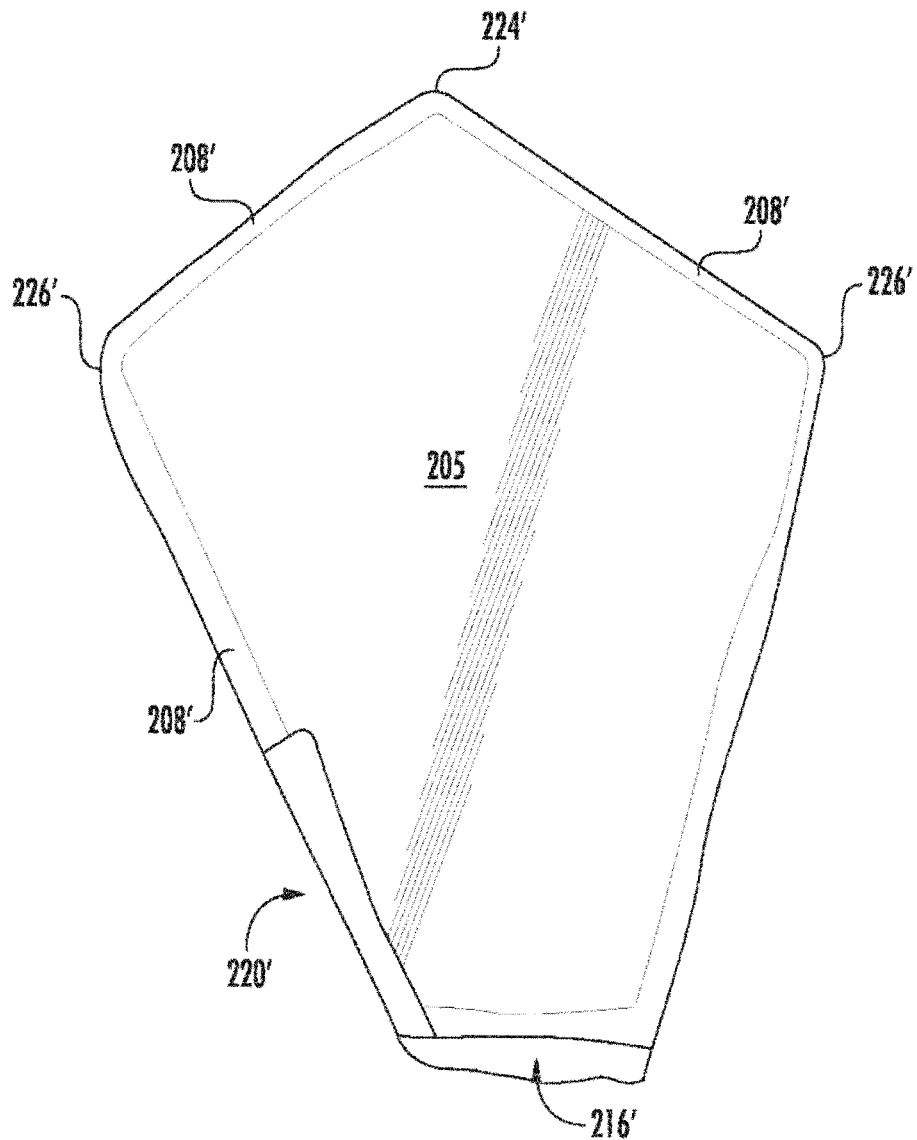
FIG. 9 is a back view thereof.

Referring to FIGS. 7-9 a second example embodiment of the bag 200' includes three kite shaped panels instead of two. In FIGS. 7-9 a prime symbol (') denotes features corresponding to the previous example. The three kite shaped panels 204', 205, & 206' are joined together at the seam 208' so that the bag has three side vertices 226'. This configuration provides more interior volume than in the first example to accommodate larger plants and trees.

Figure 10:
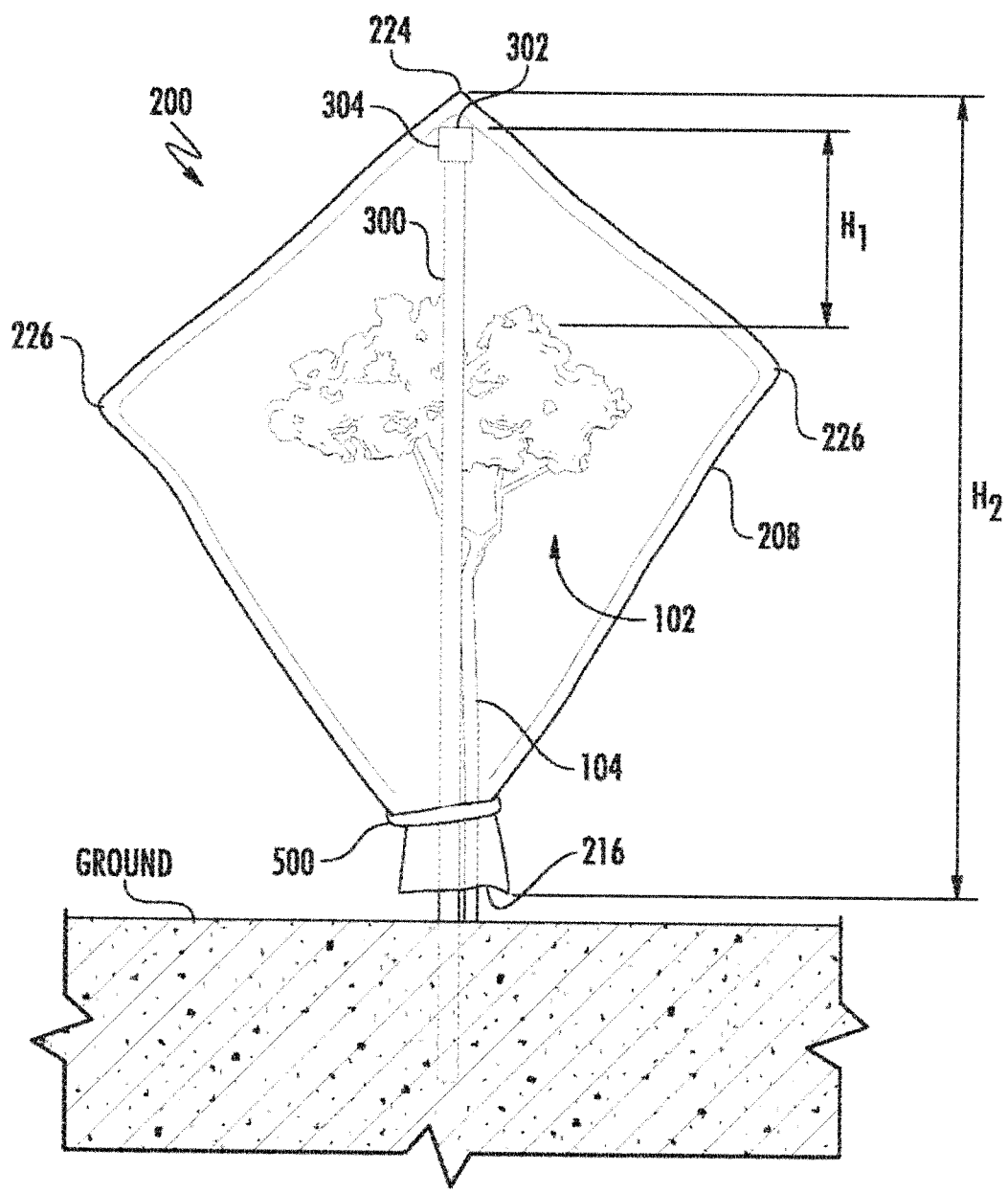
FIG. 10 is a diagrammatic illustration of the first example of the plant cover system enclosing a young tree with the wall of the bag shown as transparent so that the interior of the bag is more clearly visible.
Figure 11:
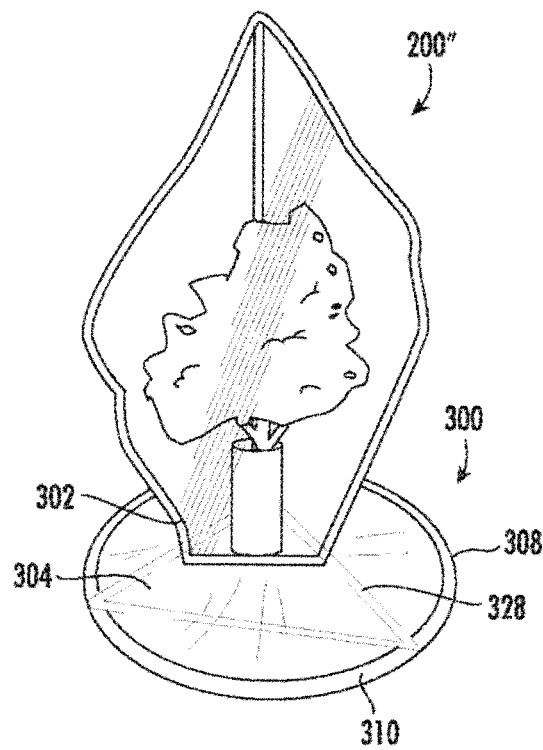
FIG. 11 is a perspective view of another example of the plant cover system installed so as to enclose a young tree where the bag includes a base member.
Figure 12:
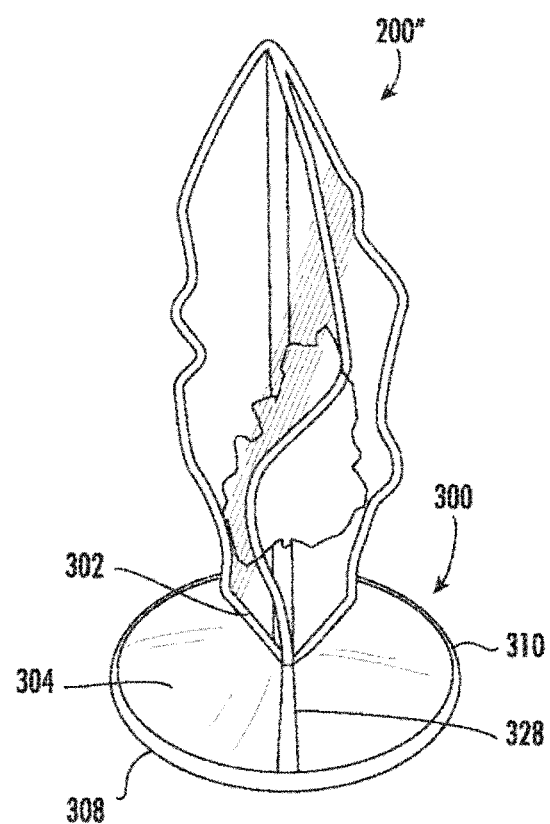
FIG. 12 is a perspective view of another example of the plant cover system installed so as to enclose a young tree where the bag includes a base member and the slot extends further up the bag than in the example of FIG. 11.
Figure 13:
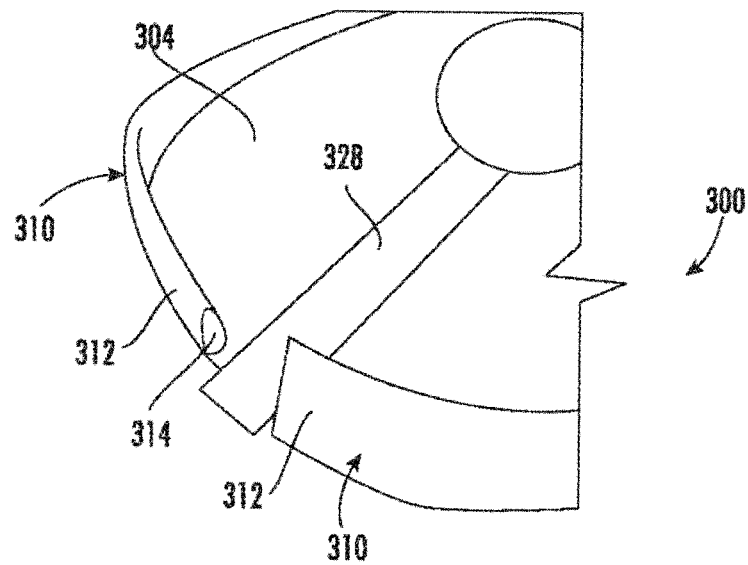
FIG. 13 is a partial view of the base member.
Figure 14:
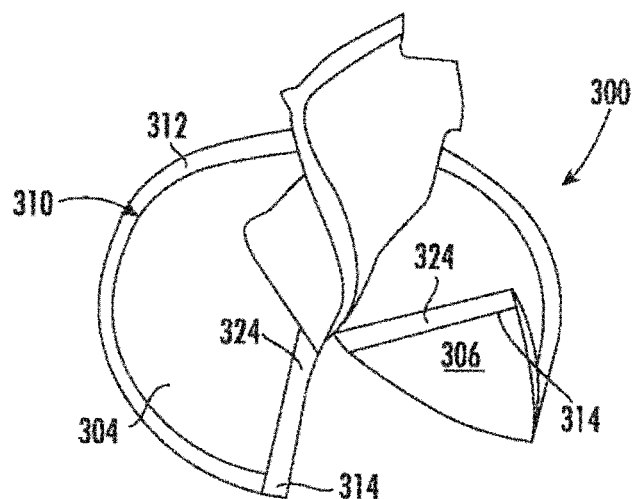
FIG. 14 is a top perspective view of the base member with the margins separated.
Figure 15:
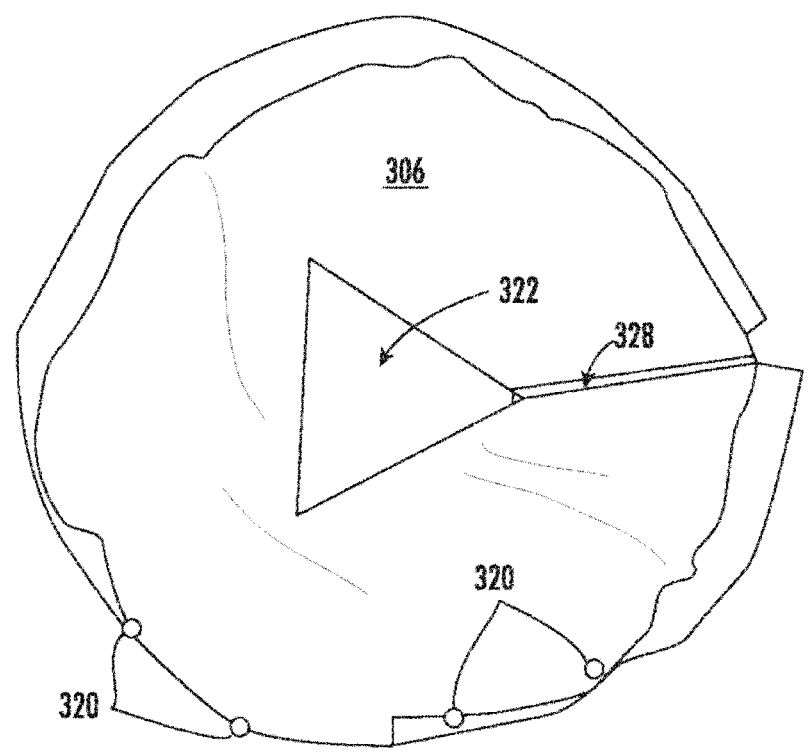
FIG. 15 is a bottom view of the base member.

Referring to FIG. 10, the vertical support member 300 may be inserted into the ground like a stake adjacent to the tree 102 so that it extends vertically alongside and in close proximity to the tree 102. The top end 302 upwardly supports the bag 200, keeping the bag 200 from resting on the tree 102 and suspended above the ground. The top of the tree and the top end 302 are offset by a height H1 to allow the tree 102 to grow within the bag 200. The top apex 224 of the bag 200 is positioned atop the top end 302 of the vertical support member 300. The seam 208 provides enough rigidity to the bag 200 to maintain its kite shape. The opening 216 is closed around the trunk 104 of the tree 102 with the closure 500.

The vertical support member 300 may take on many different forms. In the example shown, the vertical support member is a rod-shaped or tubular stake with a plastic or rubber cap 304 on the top end 302 that prevents the vertical support member from causing wear to the bag 200 when the bag 200 moves in the wind, which could generate holes in the bag 200. In other examples, it may include arms extending horizontally from the stake to support the sides of the bag 200 and produce a support frame.

The closure 500 is a string, belt, band, or the like that circumscribes the bag 200 and can be tightened to close the opening 216. The closure 500 may take many different forms such as a drawstring integrally formed with the bag 200, a separate string or rope that can be tied around the bag, a zip or cable tie, a belt, an elastic band, and the like.

The bag's 200 kite shape provides an advantage over other conventional plant covers. The kite shape makes the bag 200 somewhat form fitting to the shape of a tree. It is skinnier at the bottom and top and bulges in the middle to accommodate branches and foliage. The kite shape also provides room for the tree to grow both taller and wider within the bag 200.

The trunk cover 400 encloses the trunk 104 of the tree by encircling it. The trunk cover 400 may be a conventional tubular tree trunk cover or tree trunk wrap. In the example of FIG. 1, the trunk cover 400 has plastic tubular construction and extends from the ground up the trunk. The bag's opening 216 is tightened closed against the trunk cover 400 around the trunk 104. The trunk cover 400 may have a reflective exterior surface. The trunk cover 400 may reduce the amount of pesticides that need to be applied to the tree because it will prevent insect damage.

In an exemplary method of covering a plant using the bag, plant foliage is positioned within the bag 200 by lowering the bag 200 over the plant through the opening 216 in the bag 200. The bag is suspended the bag on a stake positioned next to the plant. The stake extends above the top of the plant. The opening is then closed around a stem or trunk of the plant. To make it easier to position the foliage within the bag 200, the slot 220 may be temporarily opened to increase the size of the opening 216. Once the foliage is within the bag, the slot 220 may then be closed.

The bag 200 is easily removable from the plant or tree when no longer needed even though the plant or tree covered might have grown because the slot 220 can be opened during removal. The bag 200 and vertical support member 300 may then be reused. The bag 200 is lightweight and flexible, allowing for efficient storage and/or shipment. When not in use, the bag 200 may be folded or rolled up for storage.

Another example embodiment of the plant cover system 200" will now be described with reference to FIGS. 11-16. This example includes a bag 200" including any of the features already described and a base member 300. The base member 300 is attached to the bag 200" along a seam 302.

The base member 300 includes an upper surface 304, a lower surface 306 opposite the upper surface 304, and a perimeter 308. The perimeter 308 in the example shown is substantially circular. The perimeter 308 may have different shapes in different examples.

The base member 300 includes an irrigation member 310 configured to provide a mechanism for irrigating a plant within the bag 200". In the example embodiment shown, the irrigation member 310 includes a tubular wall 312 defining an opening 314 and an interior space 316 extending substantially around the perimeter 308.

Figure 16:
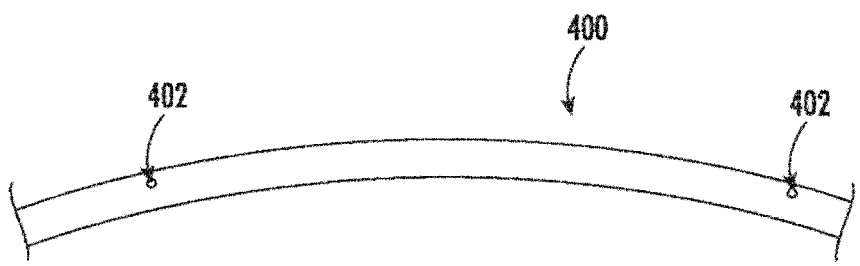
FIG. 16 is an example of an irrigation line that may be used.

The interior space 316 receives an irrigation line 400, such as the example shown in FIG. 16. The irrigation line 400 is adapted to deliver water to the plant by including openings 402 along its length through which water can escape. Water leaving the irrigation line 400 exits the irrigation member 310 by openings 320 formed in the bottom 306 of the irrigation member 400. In this example the irrigation member 310 is positioned along the perimeter 308 in order to deliver water to the outer reaches of the plant's root system. It is not necessary for the irrigation member 310 to be positioned along the perimeter 308 in every example.

The base member 300 may include a shape maintaining feature for maintaining the shape of the perimeter 308. Such a shape maintaining feature may be attached to the base member about or along the perimeter 308. The shape maintaining feature may include a wire, cable, rope, resilient pole, or the like.

The base member 300 defines an opening 322 through which the base of the plant may be positioned. The opening 322 in the example shown coincides with the seam 302 where the base member 300 and bag 200" are connected. The shape of the opening 322 is triangular in the example shown, but it may be another shape in other examples.

The base member 300 includes a pair of opposed margins 324 having cooperatively interlocking parts 326 that can temporarily be joined and separated to increase the size of the opening 322. When joined together, the margins 324 define a closed slot 328.

The margins 324 of the base member 300 may be a continuation of the margins 222 of the bag 200" such that when the margin 222, 324 are separated the slot 328 in the base member 300 and slot in the bag 200" open together to form a single continuous opening for placing the bag 200" over a plant.

The base member 300 may be made of water impermeable material such as plastic or the like to maintain water used for irrigation in the vicinity of the plant's roots in order to enhance the efficiency of irrigation. The base member 300 also forms a barrier to insects and other pests around the base of the plant.

The base member 300 may be secured in position around the plant via many mechanisms such as anchoring with stakes and/or by placing soil on top of the perimeter to weigh down the base member 300. Optionally, the top surface 304 of the base member 300 includes a reflective material that provides a mirror like finish. The base member 300 may also be used without the bag as a mechanism for retaining water in the vicinity of the plant's roots.

Figure 17:
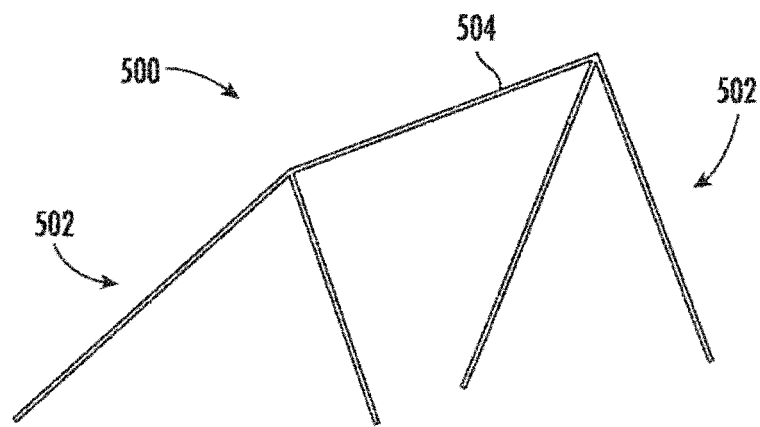
FIG. 17 is an example of a support member that may be used.
Figure 18:
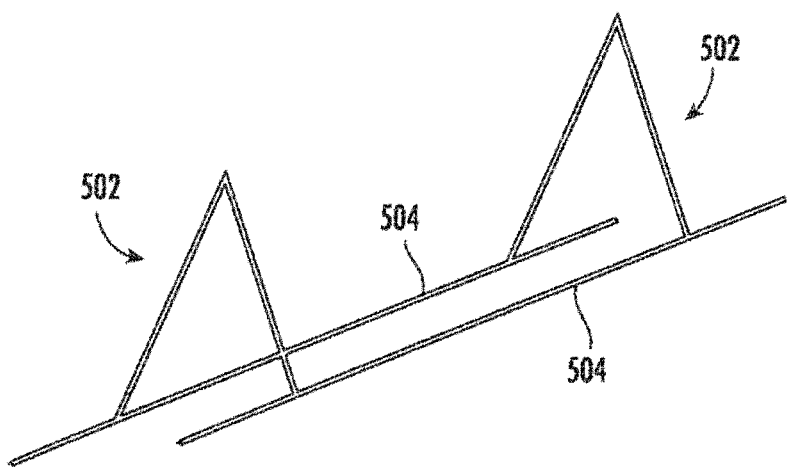
FIG. 18 is another example of a support member that may be used.
Figure 19:
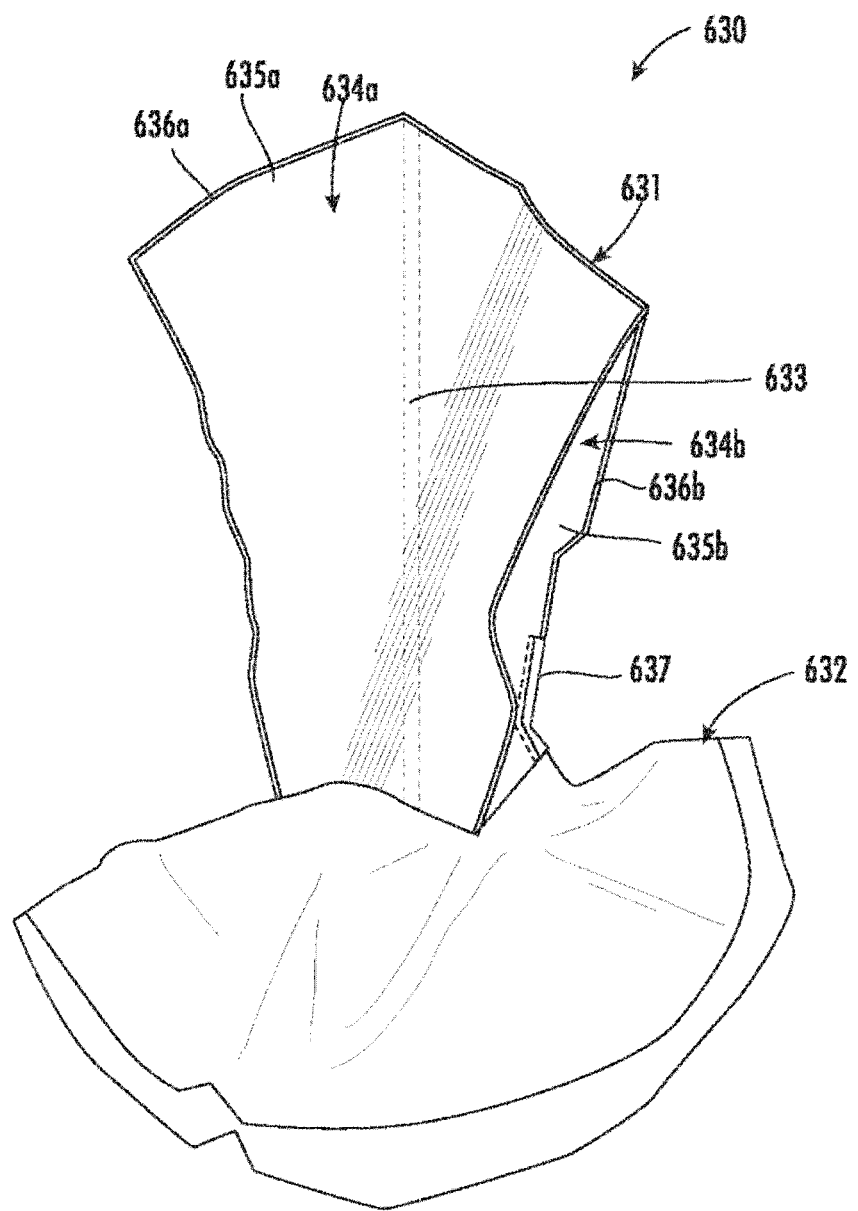
FIG. 19 is a schematic side view of a plant cover device, according to the present disclosure.
Figure 20:
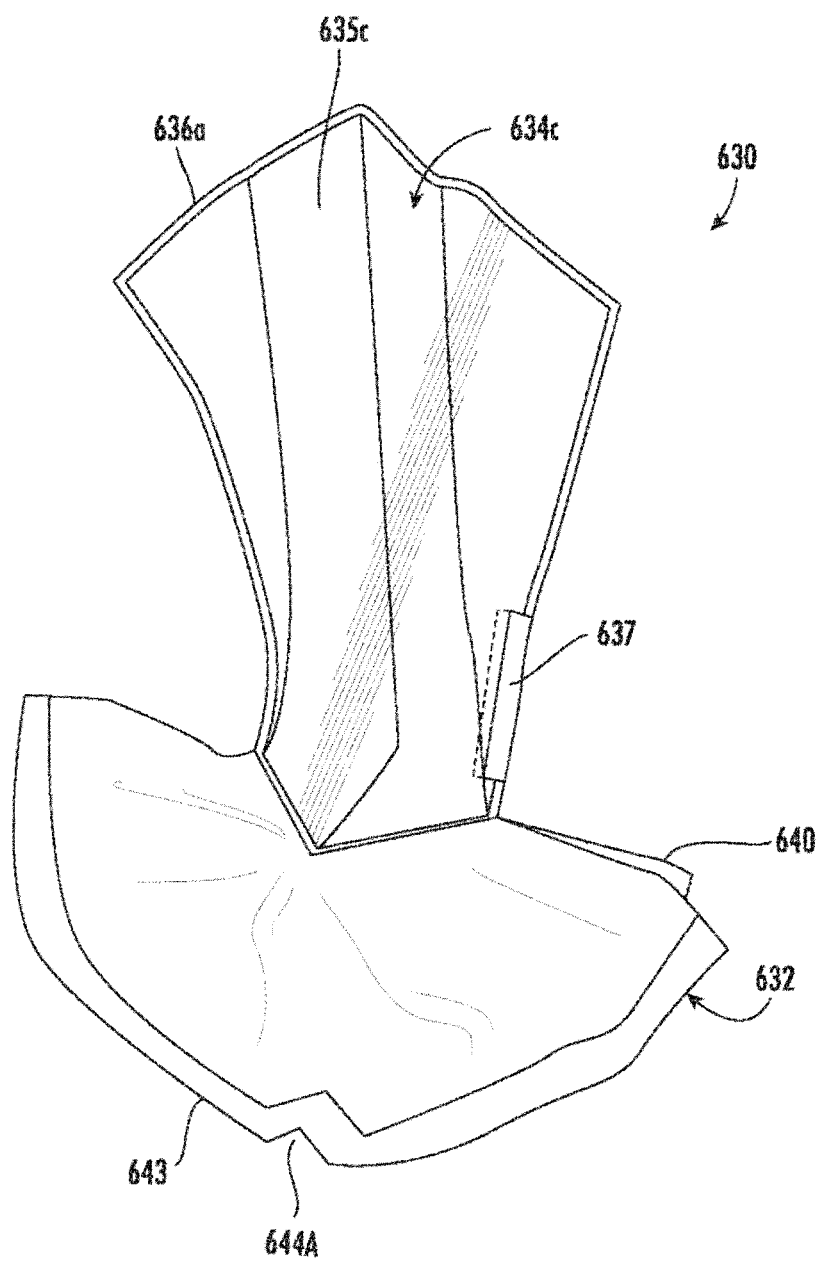
FIG. 20 is another schematic side view of the plant cover device from FIG. 19.
Figure 21:
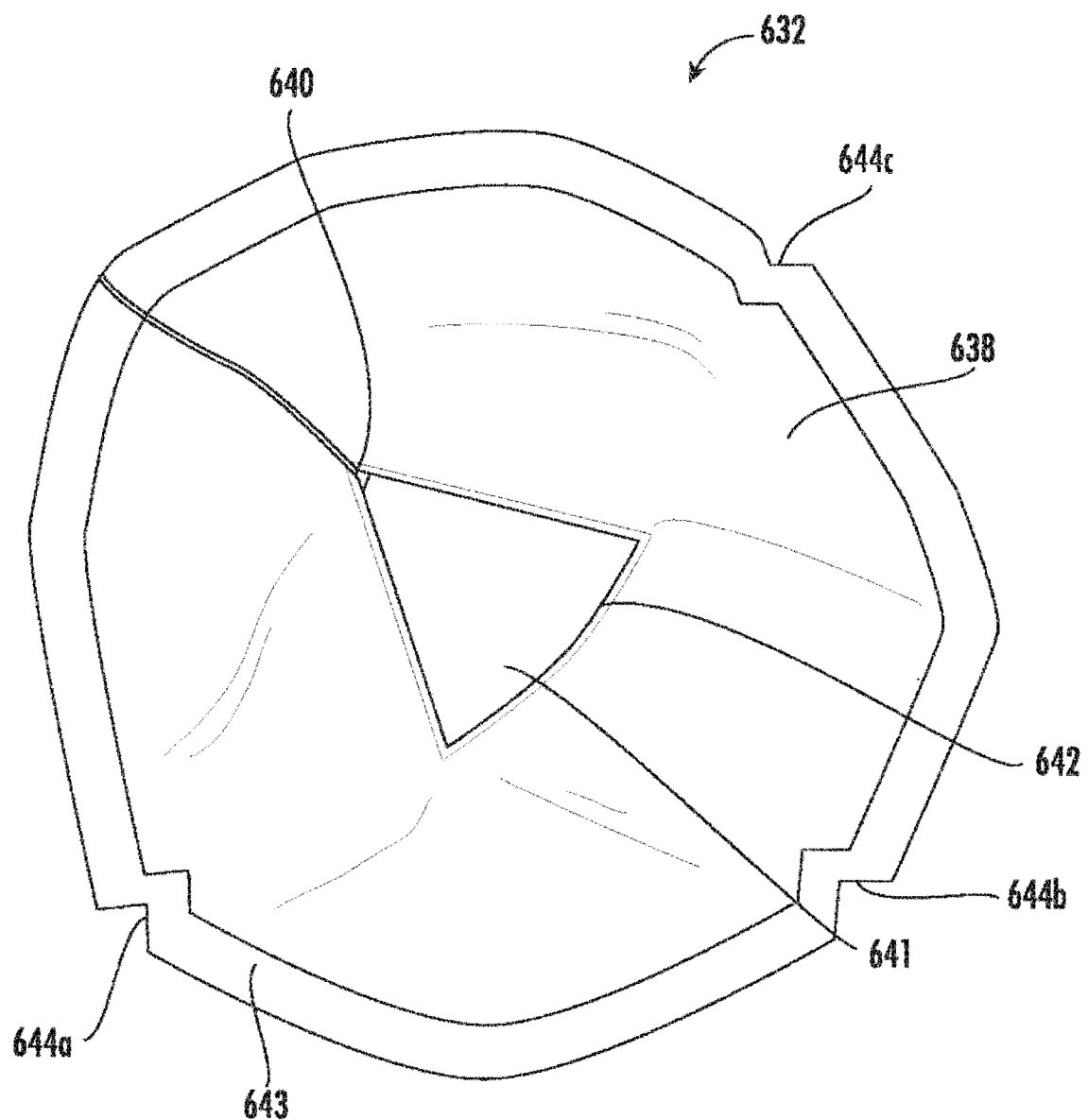
FIG. 21 is a schematic bottom plan view of the plant cover device from FIG. 19.
Figure 22:
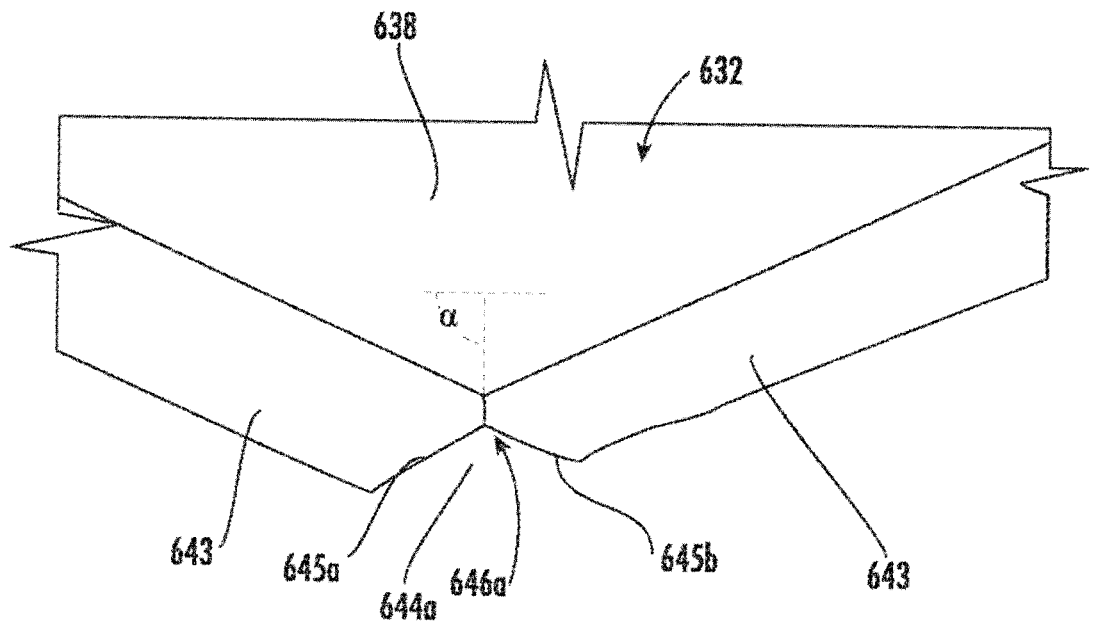
FIG. 22 is a portion of a schematic bottom plan view of the plant cover device from FIG. 19.

Referring to FIGS. 17 and 18, in order to hold the central portion of the base member 300 off the ground, a support frame 500 may be used. The support frame may be made of metal, plastic or the like. The support frame 500 includes two inverted V-shaped stands 502 interconnected by at least one cross beam 504. In use, the bottom of the V-shaped stands 502 is placed in contact with the ground and the weight of the base member 300 is supported by the support frame 500.

Referring now additionally to FIGS. 19-22, a plant cover device 630 is now described. The plant cover device 630 illustratively includes an enclosure 631, a base 632 coupled to the enclosure, and a support 633 extending vertically from a ground surface to an apex of the enclosure.

In the illustrated embodiment, the support 633 (shown in dashed lines) comprises a simple pole support. In other embodiments, the support 633 may comprise additional lateral supports at a lowermost end adjacent the ground surface. Also, in some embodiments, the support 633 may include lateral arms extending from the uppermost section of the support, creating a canopy of sorts within the enclosure 631, or a dome-shaped portion for supporting the enclosure.

The enclosure 631 illustratively includes a plurality of panels 634a-634c coupled together to define a plant-receiving cavity therein. Each of the plurality of panels 634a-634c has a "kite-shape", or in other words, the shape of two adjacent oblique triangles with abutting base sides.

This plant-receiving cavity is perhaps best seen in the embodiment of FIG. 7. Each of the plurality of panels 634a-634c includes a major mesh surface 635a-635c, and a seam 636a-636c extending along a peripheral edge of the major mesh surface. The mesh openings in the major mesh surface 635a-635c are sized to as to prevent penetration by disease carrying insects.

Adjacent panels 634a-634c are coupled together at respective seams 636a-636c. Each seam 636a-636c may comprise one or more of a stitching seam, an adhesive seam, or an integrally formed seam (e.g. attached using a heat gun applied to thermoplastic material).

The enclosure 631 illustratively includes a first fastener 637 adjacent the peripheral edge of a respective panel 634a-634c. The first fastener 637 extends along only a portion of the peripheral edge of a respective panel 634a-634c (e.g. the illustrated 33%±10). In other embodiments, the first fastener 637 extends along a greater portion of the peripheral edge of a respective panel 634a-634c, such as extending along the edge to the corner or along an entire longitudinal side of the enclosure 631.

In the illustrated embodiment, the first fastener 637 comprises opposing hook and loop interfaces on peripheral edges of adjacent panels 634a-634c. Of course, in other embodiments, other fastening arrangements can be used on peripheral edges of adjacent panels 634a-634c, such as a button and slit interface, or a snap button interface (e.g. riveted snap fastener).

Figure 23:
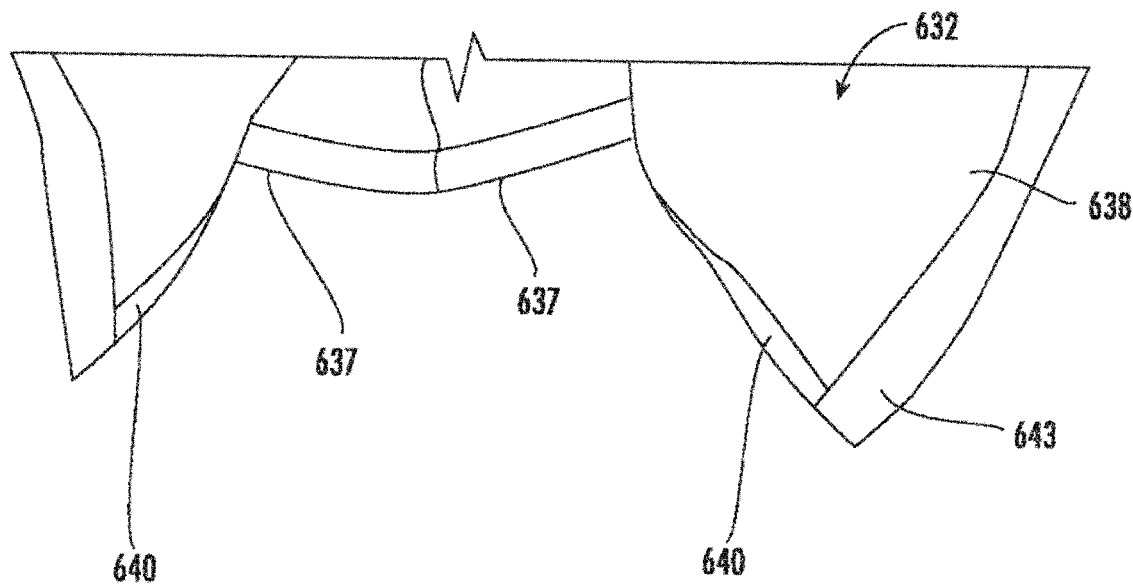
FIG. 23 is a portion of a schematic bottom plan view of the plant cover device from FIG. 19 with the first and second fasteners opened.

The base 632 illustratively includes a solid major surface 638 extending radially outward, and a second fastener 640 carried by the solid major surface and extending radially from a center to an outer peripheral edge. The base 632 illustratively has a circle-shape. In other embodiments, the base 632 may have other shapes, such as a square, an oval, or a triangle As perhaps best seen in FIG. 23, the first fastener 637 and the second fastener 640 are aligned and configured to provide access to the plant-receiving cavity. In particular, the first fastener 637 and the second fastener 640 are directly aligned in an abutting arrangement so that a user can readily open the first fastener 637 and the second fastener 640 in one easy action.

In particular, the plurality of panels 634a-634c illustratively defines a trunk receiving opening 641 at a bottom thereof. In some embodiments, the plant cover device 630 includes a tie or tether (see FIGS. 1, 7 & 10) configured to bind the lower portion of the enclosure 631 to the truck of the plant. The base 632 illustratively defines a medial opening 642 coupled (e.g. via a seam constituted similarly to the seams 636a-636c in the plurality of panels 634a-634c) to the trunk receiving opening 641. The second fastener 640 extends from the medial opening 642 to the peripheral edge of the base 632. Each of the trunk receiving opening 641 and the medial opening 642 is illustratively triangle-shaped. In other embodiments, the trunk receiving opening 641 and the medial opening 642 may have other shapes, such as a square, an oval, or a circle.

The base 632 illustratively includes a peripheral passageway 643 carried by the solid major surface 638 and configured to receive a drip line (not shown). The base 632 illustratively includes a plurality of spaced apart notches 644a-644c along the peripheral passageway 643 configured to receive respective nozzles from the drip line. As perhaps best seen in FIG. 22, each of the plurality of spaced apart notches 644a-644c comprises opposing first edges 645a-645b, and opposing second edges 646a-646b. The first and second edges 645a-645b, 646a-646b are canted with respect to each other. Each second edge 646a-646b is substantially perpendicular a (equating to an angle of 75°-105°) to a tangential line of the outer periphery of the base 632.

In some embodiments, the major mesh surface 635a-635c of each of the plurality of panels 634a-634c may comprise a polyvinyl chloride (PVC) material. The major mesh surface 635a-635c of each of the plurality of panels 634a-634c may comprise a colored mesh material configured to selectively diffract one or more spectral portions (i.e. frequency ranges) of UV radiation and/or visible light radiation.

Advantageously, the major mesh surface 635a-635c of each of the plurality of panels 634a-634c can be of different color in order to manipulate or enhance the different spectral portions of the UV spectrum. This is important for keeping a plant in a vegetative state or forcing it into a flowering state in regards to some of the intended uses. As will be appreciated, different spectral portions of the visible light spectrum and the UV spectrum can have wide ranging effects on different plants. For example, for UV radiation, —No exposure produces better growth; Violet—Enhances the color, taste, and aroma of plants Blue—Increases the growth rate of plants; Green—Enhances chlorophyll production and is used as a pigment for proper plant viewing; Yellow—Plants exhibit less growth compared to blue and red light; Red—When combined with blue light it yields more leaves and crops, depending on what is being grown; and Far Red—Speeds up the Phytochrome conversion which reduces the time a plant takes to go into a night-time state. This allows the plant to produce a greater yield. See Klein, R. M., Edsall, P. C., & Gentile, A. C. (1965). Effects of Near Ultraviolet and Green Radiations on Plant Growth. Plant Physiology, 40(5), 903-906; and "Plant Growth", Chris Thiele, May 29, 2018, Grobo Inc. website, each of which is incorporated by reference in its entirety.

The base 632 illustratively includes a reflective material on an upper surface thereof. In some embodiments, the base 632 may comprise a waterproof material.

Helpfully, this permits for conservation of water in several ways. Firstly, the integrated drip line passageway permits water to be deployed efficiently with minimal evaporation. Second, the reflective upper surface reduces the amount of thermal radiation absorbed by the ground area directly adjacent the root ball, permitting more moisture to be absorbed by the plant and not evaporated. Thirdly, the waterproof barrier also provides an additional water barrier, keeping moisture where it can be used. Also, the base 632 may prevent unintentional drift or runoff of pesticides or fertilizer applied around the base of the plant.

Moreover, the UV diffraction effect from the plurality of panels 634a-634c may the improve growth rate of the plant. In particular, Applicant has observed a 20% increase in growth with the application of the plant cover device 630. These enhanced growth benefits are in addition to the disease prevention purpose provided by the enclosure 631, as discussed with regards to the earlier embodiments. Also, the base 632 also provides another barrier to disease spread by protecting the soil adjacent the root ball from insects.

Another aspect is directed to a method for making a plant cover device 630. The method includes forming an enclosure 631 comprising a plurality of panels 634a-634c coupled together to define a plant-receiving cavity therein. Each of the plurality of panels 634a-634c has a major mesh surface 635a-635c, and a seam 636a-636c extending along a peripheral edge of the major mesh surface. Adjacent panels 634a-634c are coupled together at respective seams. The enclosure 631 includes a first fastener 637 adjacent the peripheral edge of a respective panel 634b. The method includes forming a base 632 coupled to the enclosure 631 and comprising a solid major surface 638 extending radially outward, and a second fastener 640 carried by the solid major surface and extending radially. The method further includes providing a support 633 to extend vertically from a ground surface to an apex of the enclosure 631. The first fastener 637 and the second fastener 640 are aligned and configured to provide access to the plant-receiving cavity.

Figure 24A:
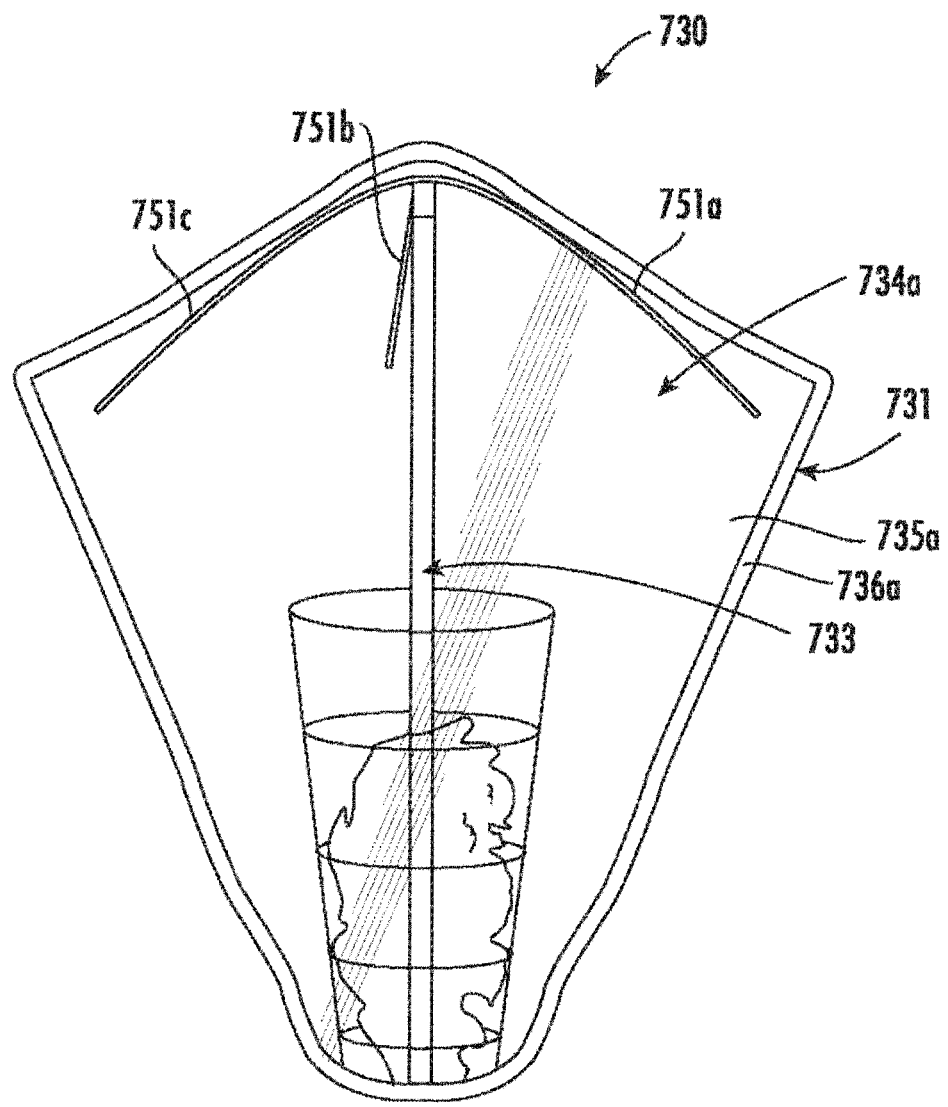
FIG. 24A is a schematic side view of another embodiment of the plant cover device, according to the present disclosure.
Figure 24B:
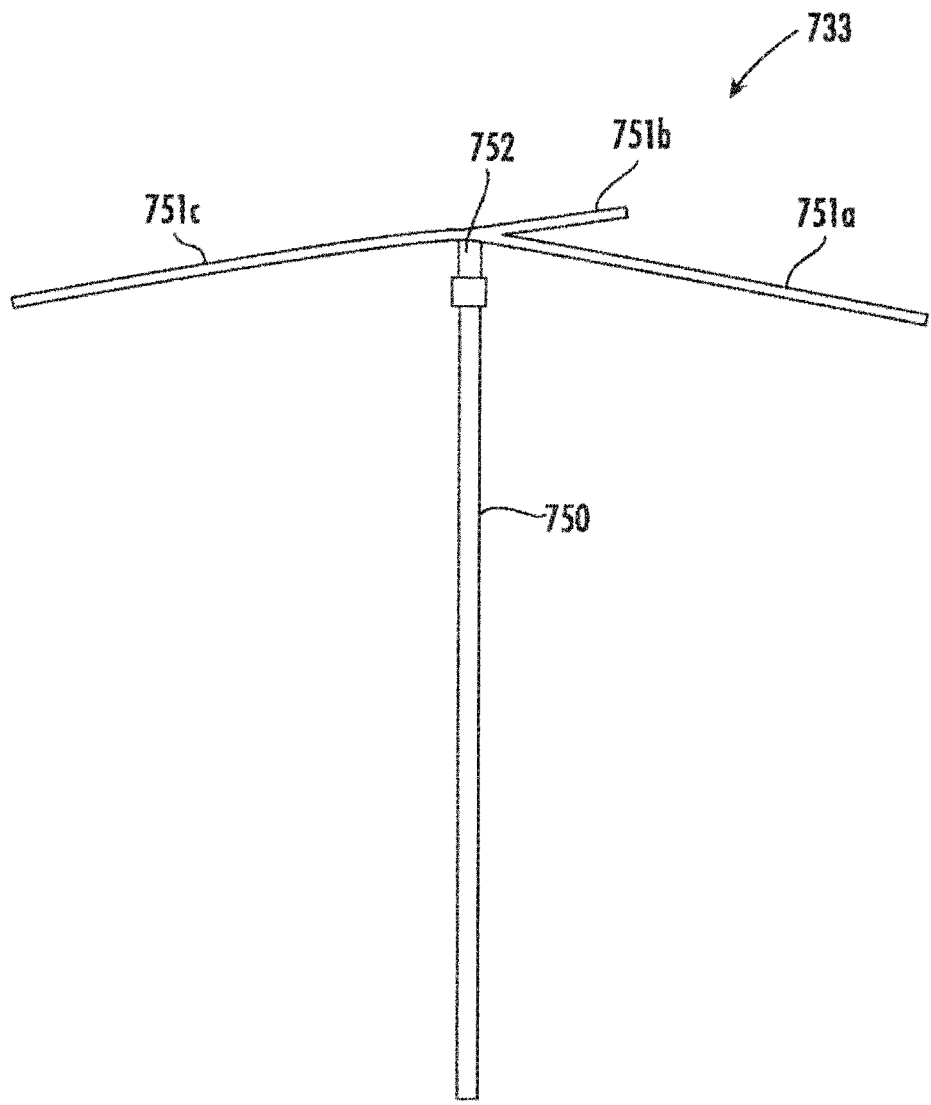
FIG. 24B is a schematic side view of the support from the plant cover device of FIG. 24A.
Figure 24C:
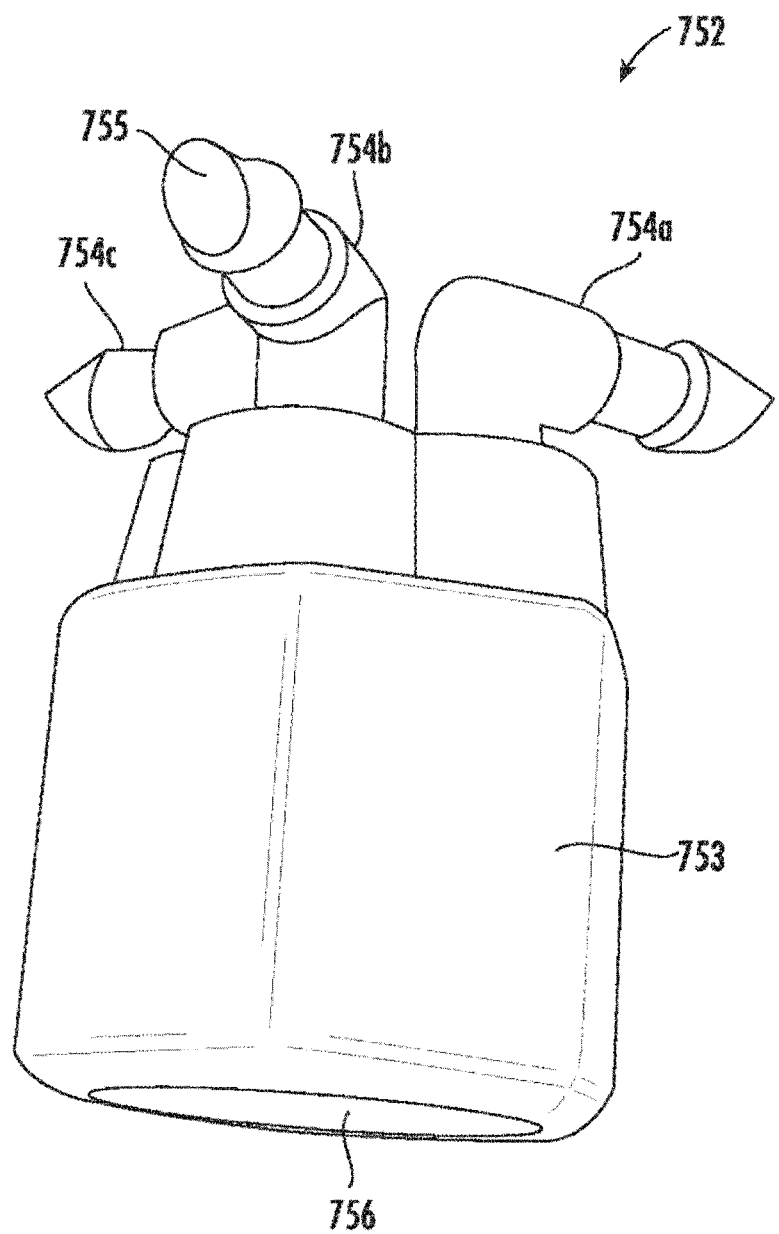
FIG. 24C is a schematic side view of a portion of the support from the plant cover device of FIG. 24A.

Referring now additionally to FIGS. 24A-24C, a plant cover device 730 is now described. In this embodiment of the plant cover device 730, those elements already discussed above with respect to FIGS. 19-23 are incremented by 700 and most require no further discussion herein. This embodiment differs from the previous embodiment in that this plant cover device 730 illustratively omits the base portion 632 of FIGS. 19-23. This embodiment also includes a different structure for the support 733. The support 733 illustratively includes a pole 750 extending from the ground surface, and a cap portion 752 coupled to an uppermost portion of the pole. The support 733 illustratively includes a plurality of arms 751a-751c extending laterally from the cap portion 752 and configured to support the enclosure 731.

As perhaps best seen in FIG. 24C, the cap portion 752 illustratively includes a body 753 defining a lower recess configured to receive the uppermost portion of the pole 750. The cap portion 752 illustratively includes a plurality of elbows 754a-754c extending from the body 753 and respectively defining arm receiving passageways 755. The arm receiving passageways 755 are configured to respectively receive the plurality of arms 751a-751c.

In yet other embodiments (not shown), the support 733 may alternatively comprise a twisted arrangement of three (1 wire for each arm) or more wires configured to be anchored within the uppermost portion of the pole 750. In particular, the wires would be formed into a twisted anchor inserted into the uppermost portion of the pole 750. The other ends of the wires would extend laterally and straight fashion to support the enclosure 731. The far distal ends of the wires would be curled downward to avoid tearing the mesh material of the plurality of panels 734a-734c. Positively, this embodiment would be less costly to manufacture than the embodiment of FIGS. 24A-24C.

Another embodiment of a plant cover device is now described. This embodiment differs from the previous embodiment in that this plant cover device illustratively comprises a trellis support structure. The trellis support structure illustratively includes a plurality of cross-shaped supports, each cross-shaped support having a ground support pole extending downward into a ground surface, first and second opposing arms extending laterally in opposite directions, and an upper arm extending upward substantially perpendicular (i.e. 90°±20°) to the ground surface. Each of the arms comprises a distal tube, and a plurality of support cables (e.g. the illustrated three support cables) extending through the distal tubes.

Although not shown, the plurality of support cables are anchored to the ground surface at opposite ends of the plant cover device. The plant cover device illustratively includes a plurality of enclosures (e.g. the illustrated enclosure of FIGS. 19-22) coupled to the plurality of support cables.

Another embodiment of a plant cover device is now described. This embodiment differs from the previous embodiment in that this plant cover device illustratively comprises support comprising a vertical support pole extending from a ground surface to an apex of the enclosure. The plant cover device illustratively comprises a circle-shaped support extending about externally the enclosure, and being coupled thereto.

Another embodiment of a plant cover device is now described. This embodiment differs from the previous embodiment in that this plant cover device illustratively comprises a support comprising a vertical support pole extending from a ground surface, and a cap portion coupled to an uppermost portion of the vertical support pole. The support illustratively includes a pair of arms extending opposite laterally and defining a figure-8 shape, i.e. a pair of opposing loops (e.g. substantially circle-shaped loops). The center point of the figure-8 shape extends through the cap portion. The enclosure is fitted over the support.

Another embodiment of a trellis structure support, is formed from a plurality of supports. The plurality of supports is aligned in a linear pattern to cover a plurality of plants. To define an enclosure, a mesh fabric is positioned over the plurality of supports. The plurality of supports is aligned arm-to-arm so that the arms are all collinear; and the plurality of supports is aligned so that the arms are all parallel.

Another embodiment of a support is now described. This embodiment differs from the previous embodiment in that this support illustratively comprises a plurality of figure-8 shaped arm pairs positioned vertically on top of each other.

Another embodiment of a support is now described. This embodiment differs from the previous embodiment in that this support illustratively comprises a plurality of figure-8 shaped arm pairs positioned vertically on top of each other. In this embodiment, there are two pairs of figure-8 shaped arms.

Another embodiment of a support is now described. This embodiment differs from the previous embodiment in that this support illustratively comprises a vertical extending support anchored in the ground surface, and a loop-shaped arm extending from an uppermost portion of the support.

Another embodiment of a support is now described. This embodiment differs from the previous embodiment in that this support illustratively comprises a vertical extending support pole anchored in a ground surface, and a loop-shaped arm (e.g. the illustrated circle-shape) extending from an uppermost portion of the support. In this embodiment, the loop-shaped arm extends downward from the uppermost portion of the support.

Another embodiment of a plant cover device is now described. This embodiment differs from the previous embodiment in that this plant cover device illustratively comprises a support comprising a support pole extending from a ground surface, and an enclosure positioned over the uppermost portion of the pole. The support illustratively includes a plurality of arms extending opposite laterally. The distal ends of the plurality of arms are coupled to ends of the enclosure, and the plurality of arms extend in a cross shaped vertex directly above and coupled to the apex of the enclosure.

Another embodiment of a plant cover device is now described. This embodiment differs from the previous embodiment in that this plant cover device illustratively comprises an enclosure having a cone-shaped upper portion, and a cylinder-shaped lower portion. The cylinder-shaped lower portion illustratively comprises a sleeve extending along a bottom periphery thereof.

The enclosure illustratively includes a ring support (e.g. elastic fiberglass pole) extending in the sleeve about the periphery of a lowermost portion of the cylinder-shaped lower portion. The cone-shaped upper portion comprises a mesh material. The cylinder-shaped lower portion comprises a mesh portion, and an opaque portion (e.g. black colored material). The opaque portion serves a similar purpose to the base of the plant cover device 630 (FIGS. 19-22) described hereinabove. Advantageously, the enclosure is easily fabricated from a single piece of material, which is fused together at peripheral edges via sewing, adhesive, or a heat gun, for example. The plant cover device illustratively includes a closure tying the cylinder-shaped lower portion to a trunk of the plant.

Another embodiment of a plant cover device is now described. This embodiment differs from the previous embodiment in that this plant cover device illustratively comprises an enclosure having a cone-shaped upper portion, and a cylinder-shaped lower portion. The cylinder-shaped lower portion illustratively comprises only a mesh material (i.e. the opaque portion is omitted).

Advantageously, these embodiments provide a greater ratio of enclosure volume to fabric area used than prior approaches. Moreover, in some embodiments, enclosure comprises a fastener (e.g. a zipper) extending from the lowermost portion of the enclosure to the apex thereof, which permits easy install and removal on larger plants.

It should be appreciated that any of the above features described above can be applied to the embodiments disclosed hereinbelow.

Figure 25:
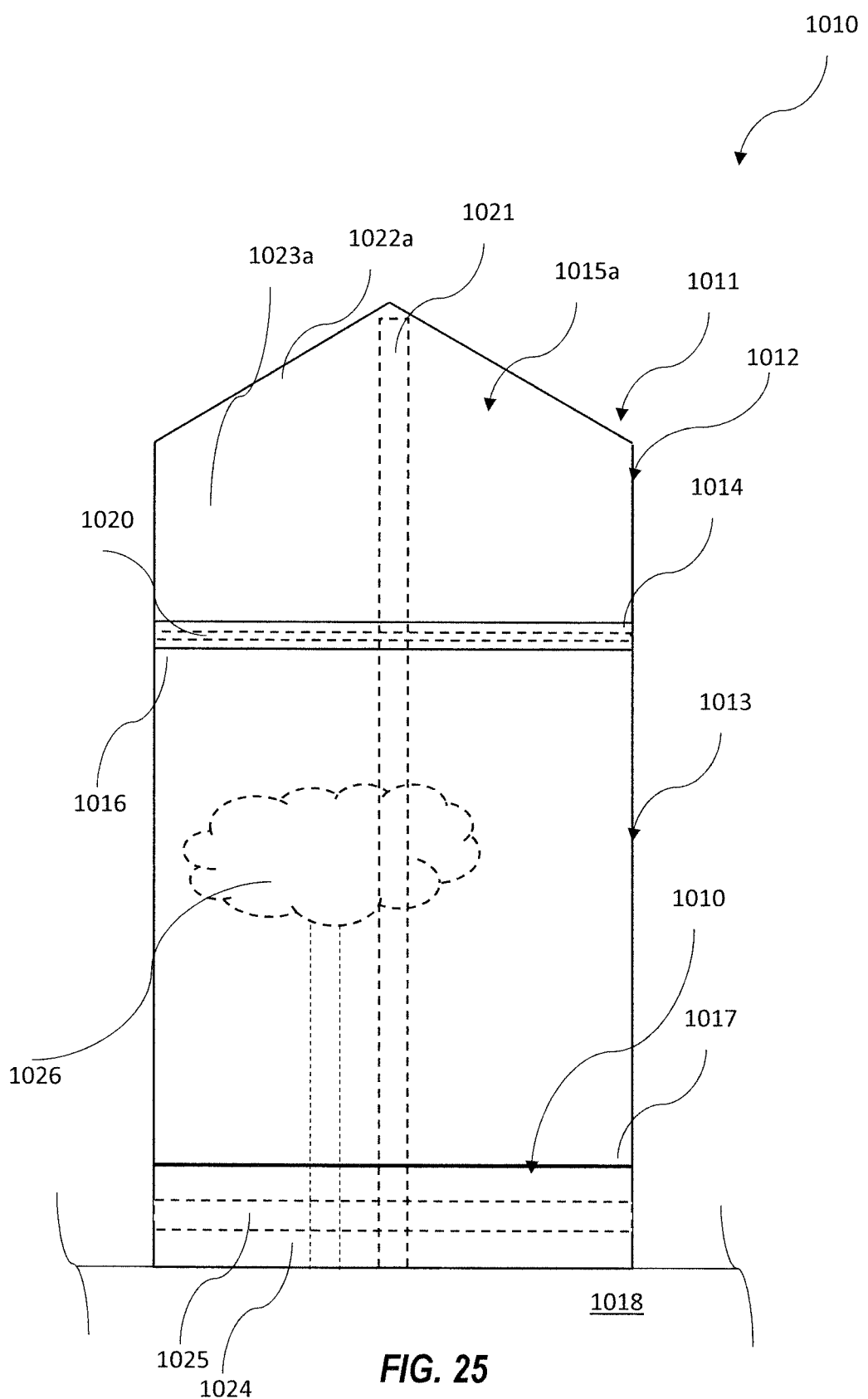
FIG. 25 is a schematic side view of another embodiment of a plant cover device, according to the present disclosure.
Figure 26A:
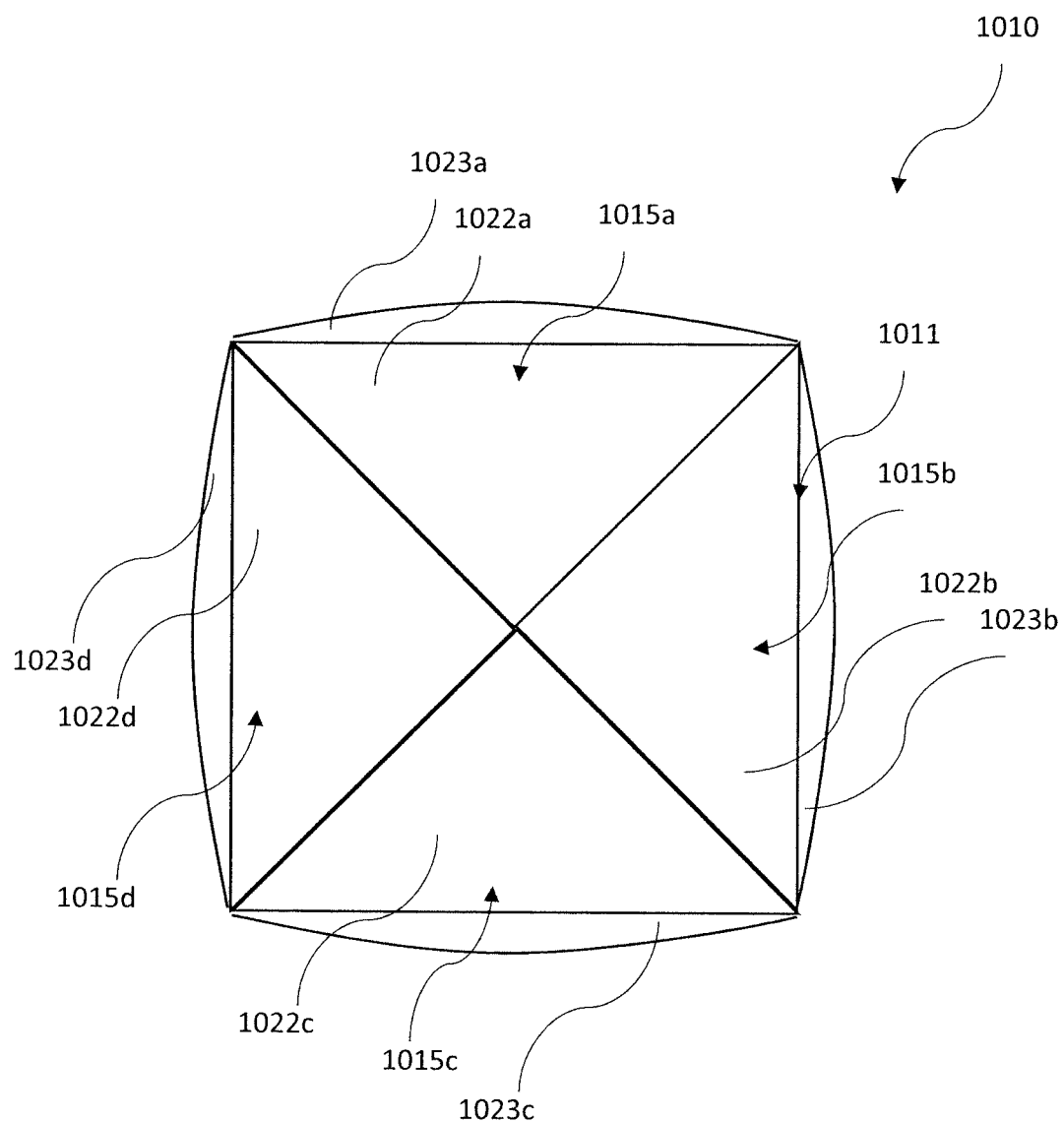
FIG. 26A is a schematic top view of the plant cover device of FIG. 25.
Figure 26B:
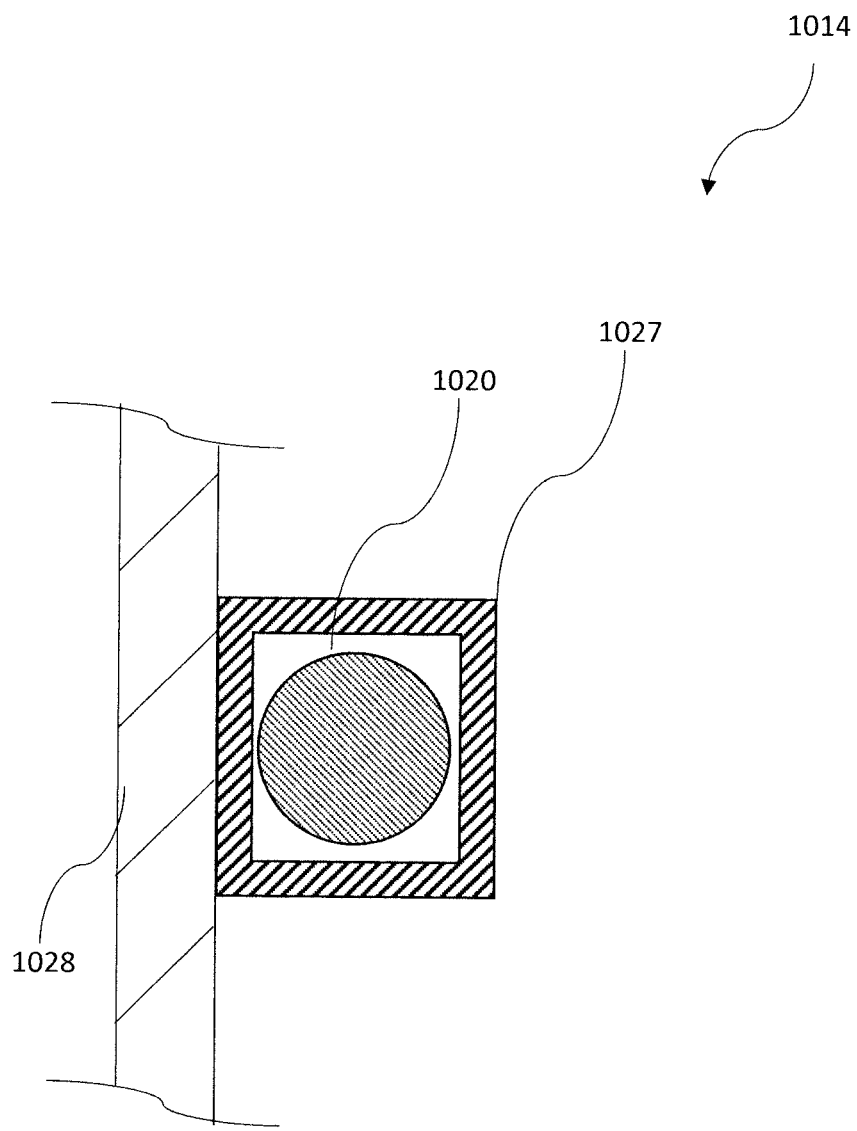
FIG. 26B is a schematic cross-sectional view of a medial seam of the plant cover device of FIG. 25.
Figure 27:
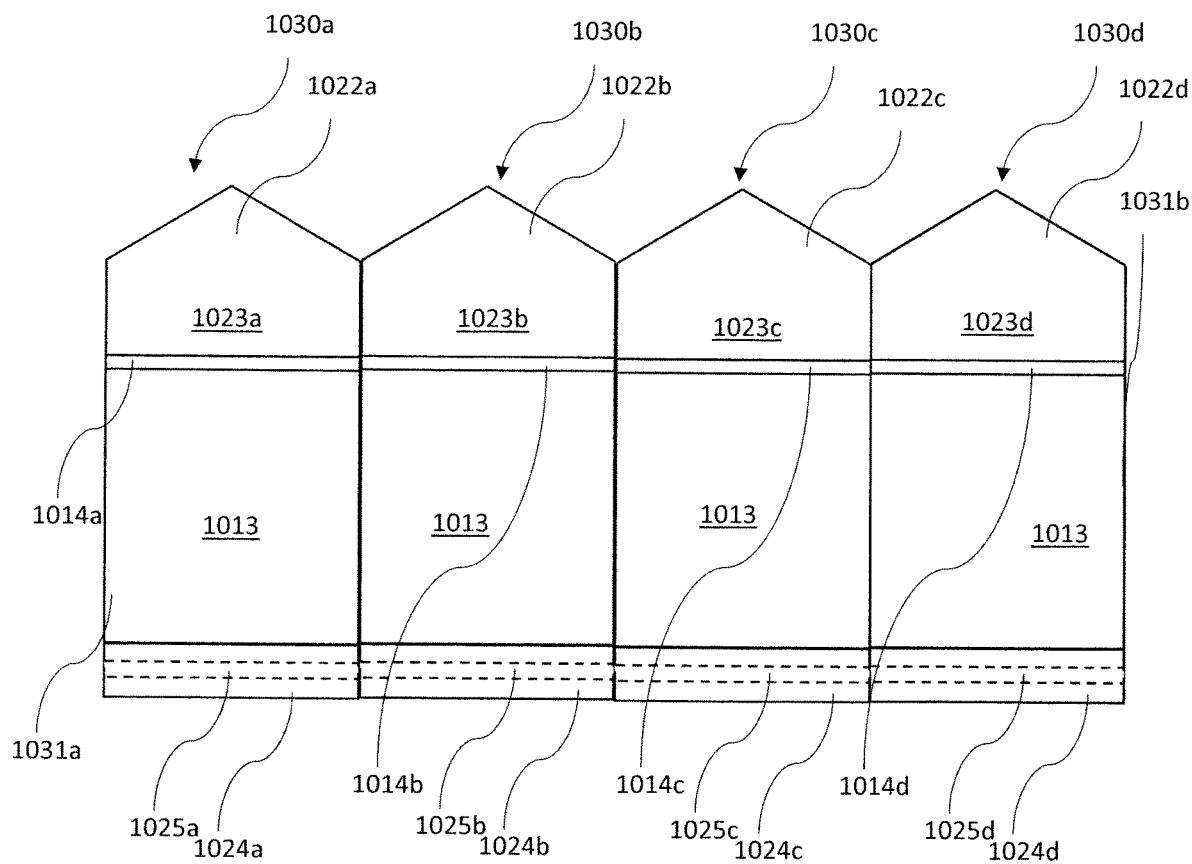
FIG. 27 is a schematic side view of the plant cover device of FIG. 25 during assembly.

Referring now to FIGS. 25-27, a plant cover device 1010 according to the present disclosure is now described. The plant cover device 1010 illustratively comprises an enclosure 1011 comprising an upper end 1012, a lower tubular end 1013 opposite the upper end, and a medial seam 1014 coupling the upper end and the lower tubular end.

The upper end 1012 illustratively includes a plurality of panels 1015*a*-1015*d* coupled together to partially define a plant-receiving cavity therein. Each of the plurality of panels 1015*a*-1015*d* has a major mesh surface, and a panel seam extending along a peripheral edge of the major mesh surface. Adjacent panels 1015*a*-1015*d* are coupled together at respective panel seams. For example, the medial seam 1014 and the panel seams may each comprise stitched seams, adhesive seams, or fused seams (i.e. using a heat gun to fuse adjacent portions of the panels 1015*a*-1015*d*).

In the illustrated embodiment, the enclosure 1011 has four faces 1030*a*-1030*d*. In other embodiments, the enclosure 1011 may include a different number of faces, for example, three faces.

The lower tubular end 1013 illustratively comprises a major mesh surface and has a first end 1016 and a second end 1017 opposite the first end. The first end 1016 is coupled to the medial seam 1014. The lower tubular end 1013 also partially defines the plant-receiving cavity therein, illustrated with a plant 1026 for illustrative clarity.

The enclosure 1011 illustratively comprises a curved flexible support 1020 carried by the medial seam 1014. The curved flexible support 1020 may comprise a loop-shaped support, for example. In some embodiments, the loop-shaped support may have a circle or oval shape. The curved flexible support 1020 may comprise a single piece flexible rod in some embodiments. In other embodiments, the curved flexible support 1020 may comprise a plurality of segments coupled together.

In some embodiments, the curved flexible support 1020 comprises fiberglass, which is flexible yet resilient enough to return to the original shape (i.e. a memoryless material). The curved flexible support 1020 may alternatively comprise flexible metallic wire. This embodiment is advantageous for at least the following reasons. The curved flexible support 1020 may be folded over temporarily for shipping, which allows for efficient transport and retail packaging. Additionally, once deployed in the field, the curved flexible support 1020 can withstand adverse weather conditions and return to the original shape.

As perhaps best seen in FIG. 26B, the medial seam 1014 illustratively includes an outer mesh piece 1028, and an annular sleeve 1027 coupled to the outer mesh piece. The curved flexible support 1020 is carried within the annular sleeve 1027. In this embodiment, the annular sleeve 1027 is carried internally within the plant-receiving cavity, but in other embodiments, the annular sleeve 1027 may be carried externally. In some embodiments, the annular sleeve 1027 is radially contiguous about the medial seam 1014. In other embodiments, the annular sleeve 1027 may comprise one or more openings for installation of the curved flexible support 1020 by a user.

The enclosure 1011 illustratively comprises a pole 1021 extending vertically from a surface 1018 to an apex of the enclosure. In some embodiments, the surface 1018 comprises a ground surface, but may also comprise a potted soil surface (e.g. tower garden applications).

As perhaps best seen in FIG. 25, each of the plurality of panels 1015a-1015d comprises a pentagon-shaped panel. Each of the plurality of panels 1015a-1015d comprises a triangle-shaped section 1022a-1022d, and a rectangle shaped section 1023a-1023d coupled to the triangle-shaped section. The respective triangle-shaped sections 1022a-1022d of the plurality of panels 1015a-1015d define the apex of the enclosure 1011 and an uppermost portion of the plant-receiving cavity.

In the illustrated embodiment, the second end 1017 of the lower tubular end 1013 comprises a solid section 1024 at a lowermost end of the lower tubular end. The solid section 1024 is opaque to visible light radiation and waterproof. In some applications, the lowermost portion of the solid section 1024 is coupled to the surface 1018 via a plurality of stakes, for example. In some embodiments, the solid section 1024 may comprise a reflective material.

Advantageously, when the plant cover device 1010 is used in field applications, the solid section 1024 provides shade around the root ball. The shade is helpful for a couple of reasons: the permanent shade kills weeds, and the permanent shade reduces evaporation of water applied to the root ball (e.g. from low flow irrigation systems, such as drip lines). Moreover, the waterproof feature further reduces evaporation of the applied water. Also, the solid section 1024 provides a thermal insulation barrier, retaining ground thermal energy when the ambient temperature drops.

The second end 1017 of the lower tubular end 1013 illustratively includes a drawstring 1025 coupled at a lowermost end of the lower tubular end. In some applications, the drawstring 1025 is used to bind the solid section 1024 to a trunk of the plant, sealing in the plant-receiving cavity.

Each mesh surface of the enclosure 1011 comprises a plurality of mesh openings, each opening having a diameter of less than 300 μm. As will be appreciated, this mesh size is sufficient to provide a barrier to Asian citrus psyllid, and therefor citrus greening disease transmission. It should be appreciated that the upper and side portions of the enclosure 1011 are sealed to provide a proper barrier to insects.

As perhaps best seen in FIG. 27, the method of assembly of the enclosure 1011 is shown, which begins with several flat mesh pieces. The lower tubular end 1013 is formed from a single strip of mesh material. Each of the plurality of panels 1015a-1015d is formed from a custom cut mesh piece in the illustrated pentagon shape. Subsequently, the four panel pieces are coupled to the single strip of mesh material via the medial seam 1014a-1014d to define four faces 1030a-1030d for the enclosure 1011. At this point, the mesh piece is arranged in tubular form and opposing ends 1031a-1031b of the mesh piece are coupled together at a longitudinal seam. Then, the triangle-shaped sections 1022a-1022d are coupled together to define the apex of the plant-receiving cavity.

Another aspect is directed to a method of making a plant cover device 1010. The method includes forming an enclosure 1011 comprising an upper end 1012, a lower tubular end 1013 opposite the upper end, and a medial seam 1014 coupling the upper end and the lower tubular end. The upper end 1012 includes a plurality of panels 1015a-1015d coupled together to partially define a plant-receiving cavity therein. Each of the plurality of panels 1015a-1015d has a major mesh surface, and a panel seam extending along a peripheral edge of the major mesh surface. Adjacent panels 1015a-1015d are coupled together at respective panel seams. The lower tubular end 1013 comprises a major mesh surface and have a first end 1016 and a second end 1017 opposite the first end, the first end being coupled to the medial seam 1014. The lower tubular end 1013 also partially defines the plant-receiving cavity therein. The enclosure 1011 comprises a curved flexible support 1020 carried by the medial seam 1014. The method comprises providing a pole 1021 to extend vertically from a surface 1018 to an apex of the enclosure 1011.

Figure 28:
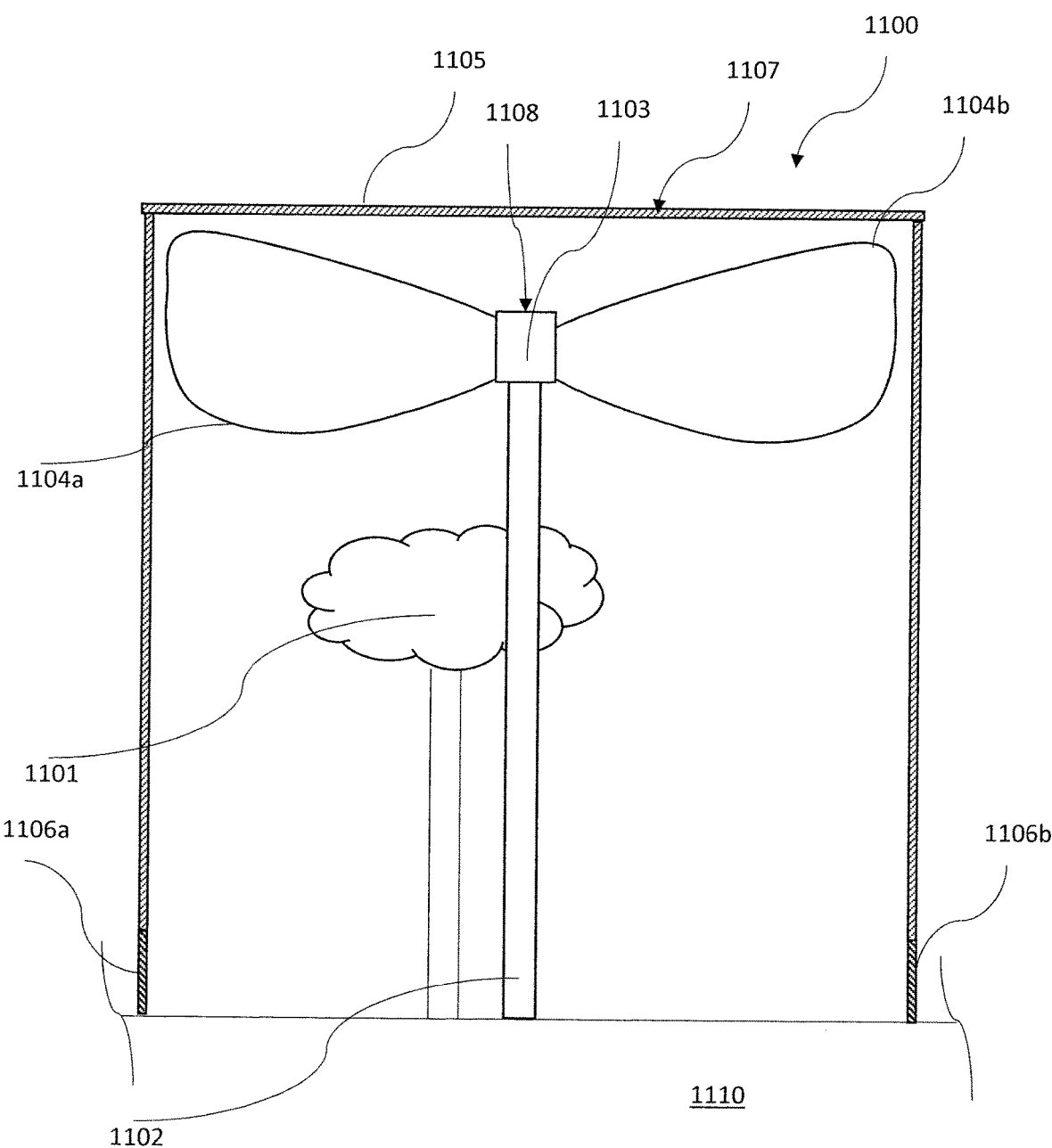
FIG. 28 is a schematic cross-sectional view of another embodiment of a plant cover device, according to the present disclosure.

Referring now to FIG. 28, a plant cover device 1100 is now described. As will be appreciated, this plant cover device 1100 is intended for row crop applications (i.e. a long line of plants 1101 are planted in a near linear path). Of course, the plant cover device 1100 can be used in other applications. The plant cover device 1100 illustratively comprises a spreader device 1108, and a mesh 1107 over the spreader device. As will be appreciated, the mesh 1107 is comprises a mesh piece long enough to extend between ends of a row crop segment. For drawing clarity, only one plant 1101 is illustrated, but it should be appreciated that the row may comprise a large number of plants.

The spreader device 1108 illustratively comprises a support 1102 extending from a ground surface 1110, a bracket 1103 coupled to an uppermost portion of the support, and a pair of support arms 1104a-1104b extending from the bracket. The mesh 1107 comprises a major mesh surface 1105 extending over the top of the plant 1101 and substantially down the longitudinal sides, and solid sections 1106a-

1106*b* coupled to the major mesh surface and adjacent the ground surface 1110. The solid sections 1106*a*-1106*b* may be anchored to the ground surface 1110 and provide the same benefits as noted above for the embodiment of the plant cover device 1010 of FIG. 25. Although not shown, the plant cover device 1010 illustratively comprises a coupling (e.g. a zip tie) between the major mesh surface 1105 and the bracket 1103.

As will be appreciated, the pair of support arms 1104*a*-1104*b* is to support and abut the mesh 1107. In particular, the pair of support arms 1104*a*-1104*b* is intended to prevent the major mesh surface 1105 from resting on the plant 1101.

Figure 29:
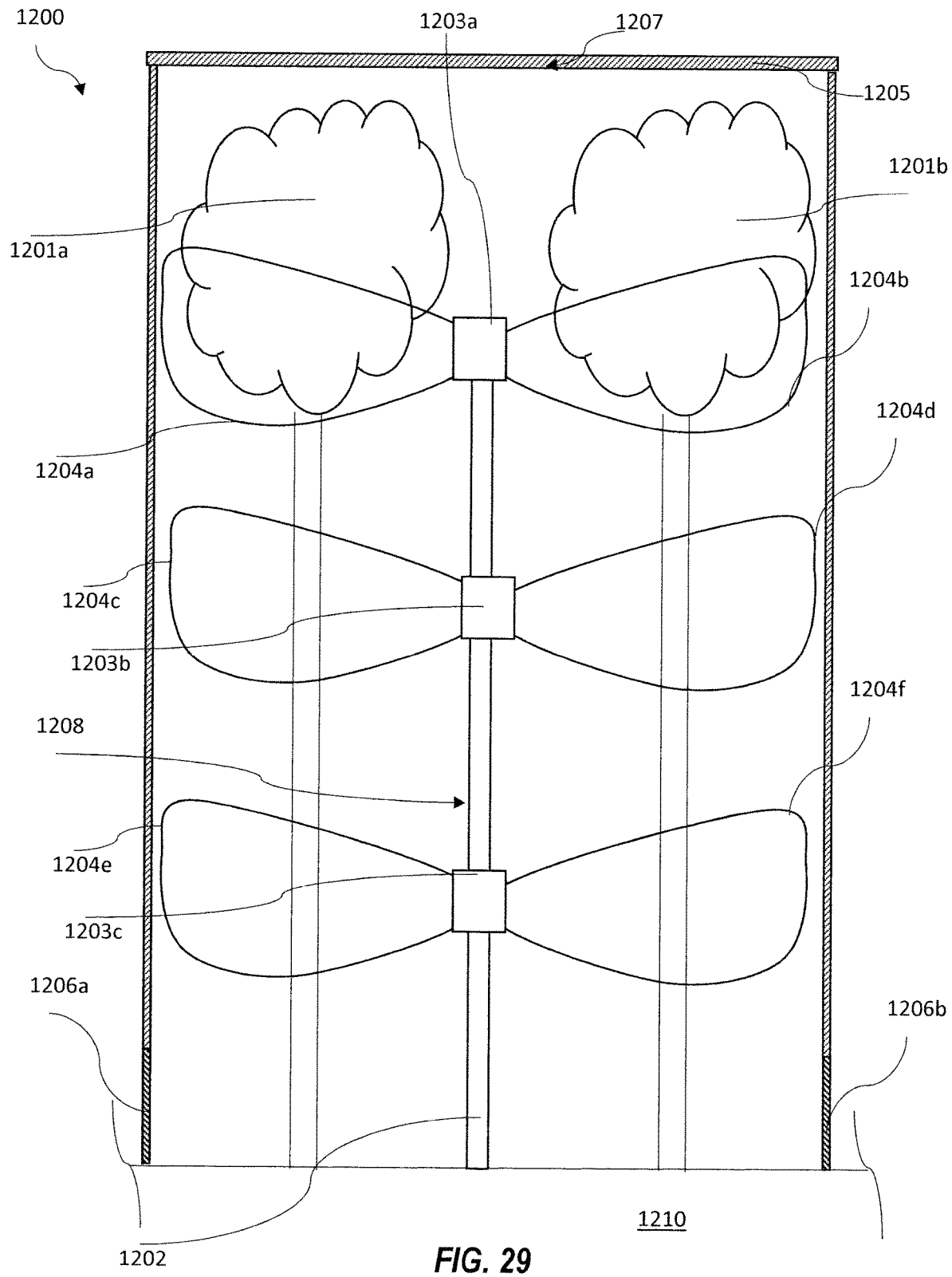
FIG. 29 is a schematic cross-sectional view of yet another embodiment of a plant cover device, according to the present disclosure.

Referring now additionally to FIG. 29, another embodiment of the plant cover device 1200 is now described. In this embodiment of the plant cover device 1200, those elements already discussed above with respect to FIG. 28 are incremented by 100 and most require no further discussion herein. This embodiment differs from the previous embodiment in that this plant cover device 1200 illustratively includes a spreader device 1208 comprising a plurality of brackets 1203*a*-1203*c*, and a plurality of support arm pairs 1204*a*-1204*f* coupled respectively to the plurality of brackets. The plurality of support arm pairs 1204*a*-1204*f* is vertically aligned.

Helpfully, in this embodiment of the plant cover device 1200, the plant cover device 1200 may cover two rows of the plants 1201*a*-1201*b*. It should be appreciated that the multiple bracket features of the plant cover device 1200 can be readily applied to the plant cover device embodiments of FIGS. 30-32. Also, in some embodiments, the support 1207 may comprise a single piece where the brackets 1203*a*-1203*c* fit or slide thereover, but in other embodiments, the support may comprise a plurality of segments, and the brackets also couple the segments together.

Figure 30:
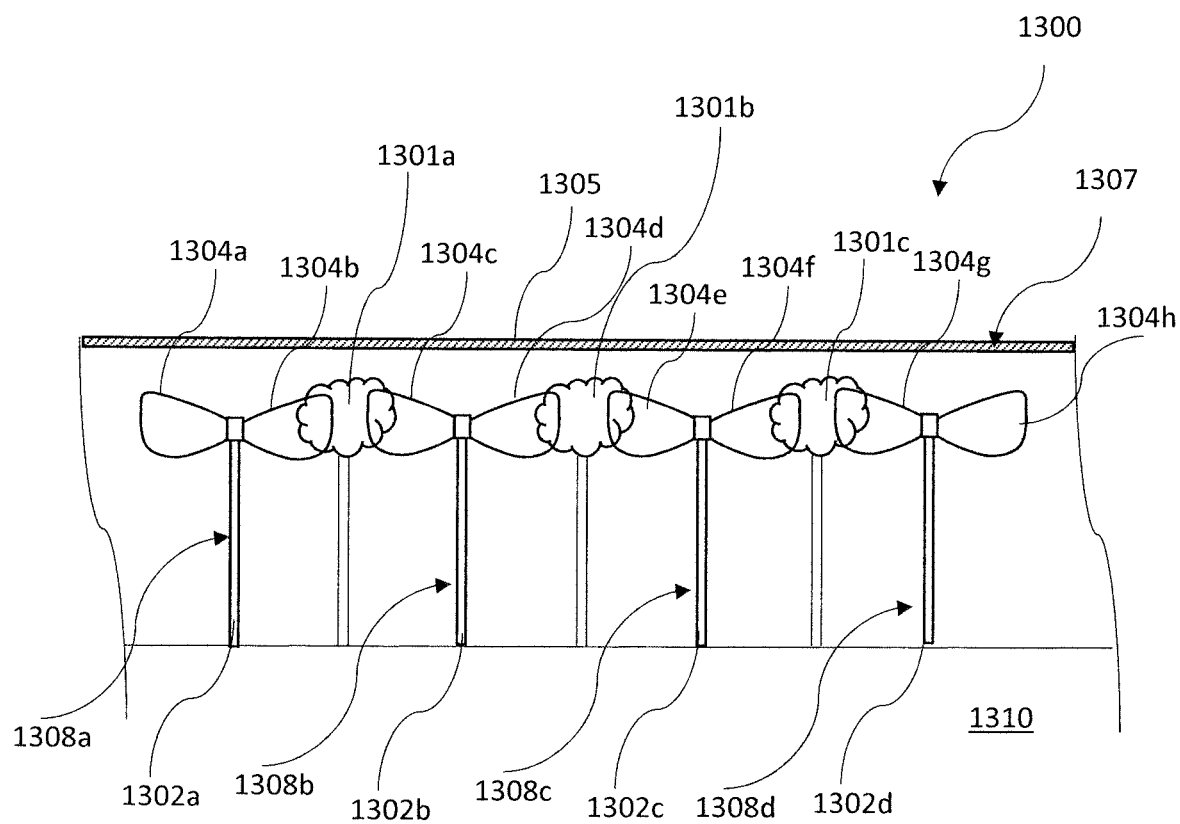
FIG. 30 is a schematic cross-sectional view of another embodiment of a plant cover device, according to the present disclosure.

Referring now additionally to FIG. 30, another embodiment of the plant cover device 1300 is now described. In this embodiment of the plant cover device 1300, those elements already discussed above with respect to FIG. 28 are incremented by 200 and most require no further discussion herein. This embodiment differs from the previous embodiment in that this plant cover device 1300 illustratively includes the plurality of spreader devices 1308*a*-1308*d* arranged laterally. Here, adjacent support arms 1304*b*-1304*c* from adjacent spreader devices 1308*a*-1308*b* flank respective plants 1301*a*. Also, the plurality of support arm pairs 1304*a*-1304*h* is arranged substantially parallel (i.e. ±20° of parallel) to the row of plants 1401*a*-1401*c*.

Figure 31:
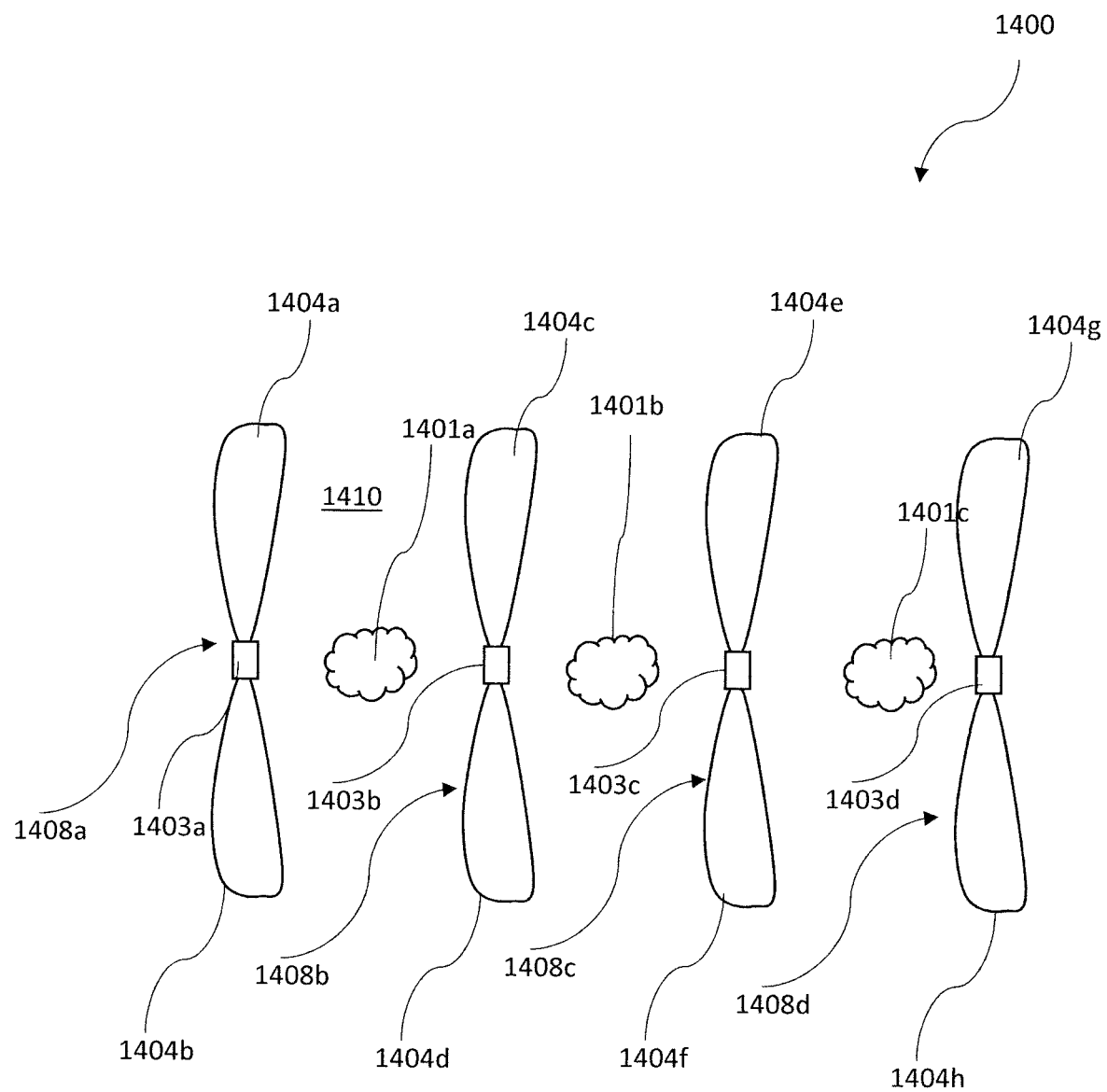
FIG. 31 is a schematic top view of another embodiment of a plant cover device with the mesh removed, according to the present disclosure.

Referring now additionally to FIG. 31, another embodiment of the plant cover device 1400 is now described. In this embodiment of the plant cover device 1400, those elements already discussed above with respect to FIG. 28 are incremented by 300 and most require no further discussion herein. This embodiment differs from the previous embodiment in that this plant cover device 1400 illustratively includes the plurality of spreader devices 1408*a*-1408*d* arranged interspersed between the plants 1401*a*-1401*c*. Also, the plurality of support arm pairs 1404*a*-1404*h* is arranged substantially orthogonal (i.e. ±20° of) 90° to the row of plants 1401*a*-1401*c*.

Figure 32:
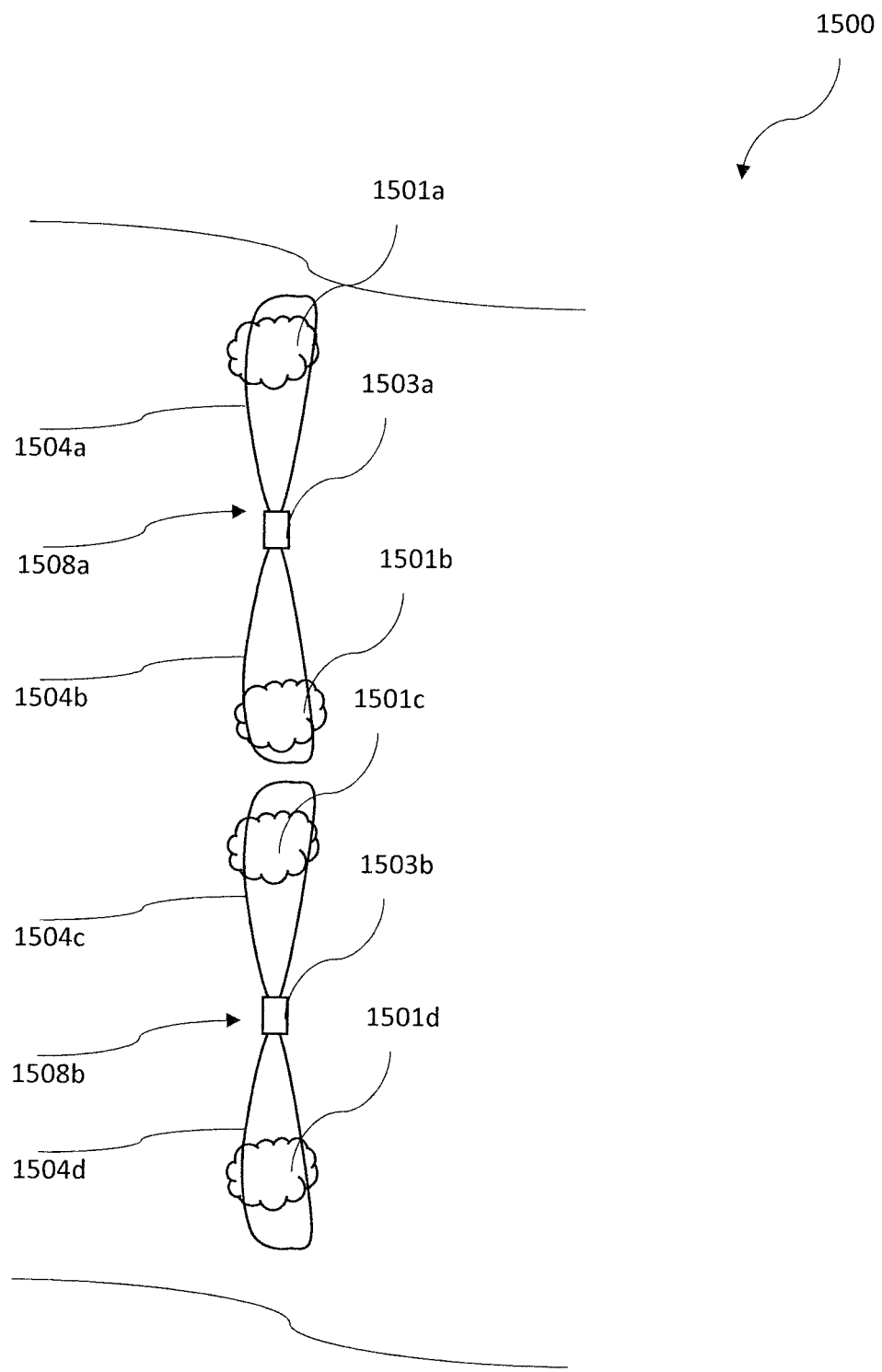
FIG. 32 is a schematic top view of yet another embodiment of a plant cover device with the mesh removed, according to the present disclosure.

Referring now additionally to FIG. 32, another embodiment of the plant cover device 1500 is now described. In this embodiment of the plant cover device 1500, those elements already discussed above with respect to FIG. 28 are incremented by 400 and most require no further discussion herein. This embodiment differs from the previous embodiment in that this plant cover device 1500 illustratively includes the plurality of spreader devices 1508*a*-1508*b* arranged laterally. Here, adjacent support arms 1504*a*-1504*d* are aligned over respective plants 1501*a*-1501*d*. Also, the plurality of support arm pairs 1504*a*-1504*d* are arranged substantially parallel (i.e. ±20° of parallel) to the row of plants 1501*a*-1501*d*.

Figure 33:
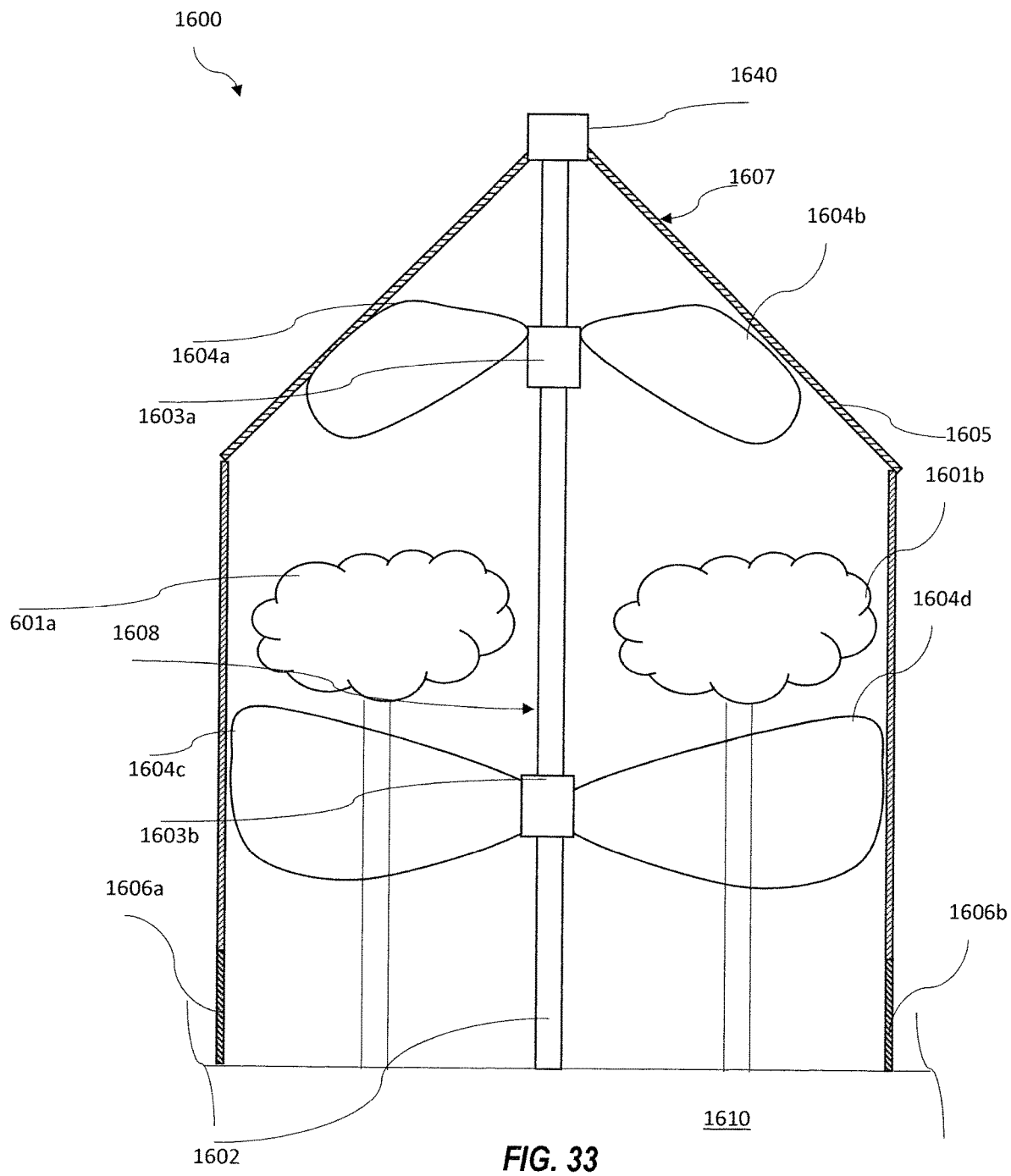
FIG. 33 is a schematic cross-sectional view of yet another embodiment of a plant cover device, according to the present disclosure.

Referring now additionally to FIG. 33, another embodiment of the plant cover device 1600 is now described. In this embodiment of the plant cover device 1600, those elements already discussed above with respect to FIG. 28 are incremented by 500 and most require no further discussion herein. This embodiment differs from the previous embodiment in that this plant cover device 1600 illustratively includes a spreader device 1608 comprising a plurality of brackets 1603*a*-1603*b*, and a plurality of support arm pairs 1604*a*-1604*d* coupled respectively to the plurality of brackets. The plurality of support arm pairs 1604*a*-1604*d* is vertically aligned.

Helpfully, in this embodiment of the plant cover device 1600, the plant cover device 1600 may cover two rows of the plants 1601*a*-1601*b*. This plant cover device 1600 illustratively includes a coupling 1640 (e.g. zip tie, tether, wire) at an uppermost portion of the support 1602 for anchoring the mesh 1607 to the support. In this embodiment, the uppermost support arm pair 1604*a*-1604*b* abuts and supports the mesh 1607 and prevents it from resting on the plants 1601*a*-1601*b*. The lowermost support arm pair 1604*c*-1604*d* also abuts and supports the mesh 1607 and prevents it from resting on the plants 1601*a*-1601*b*.

Figure 34:
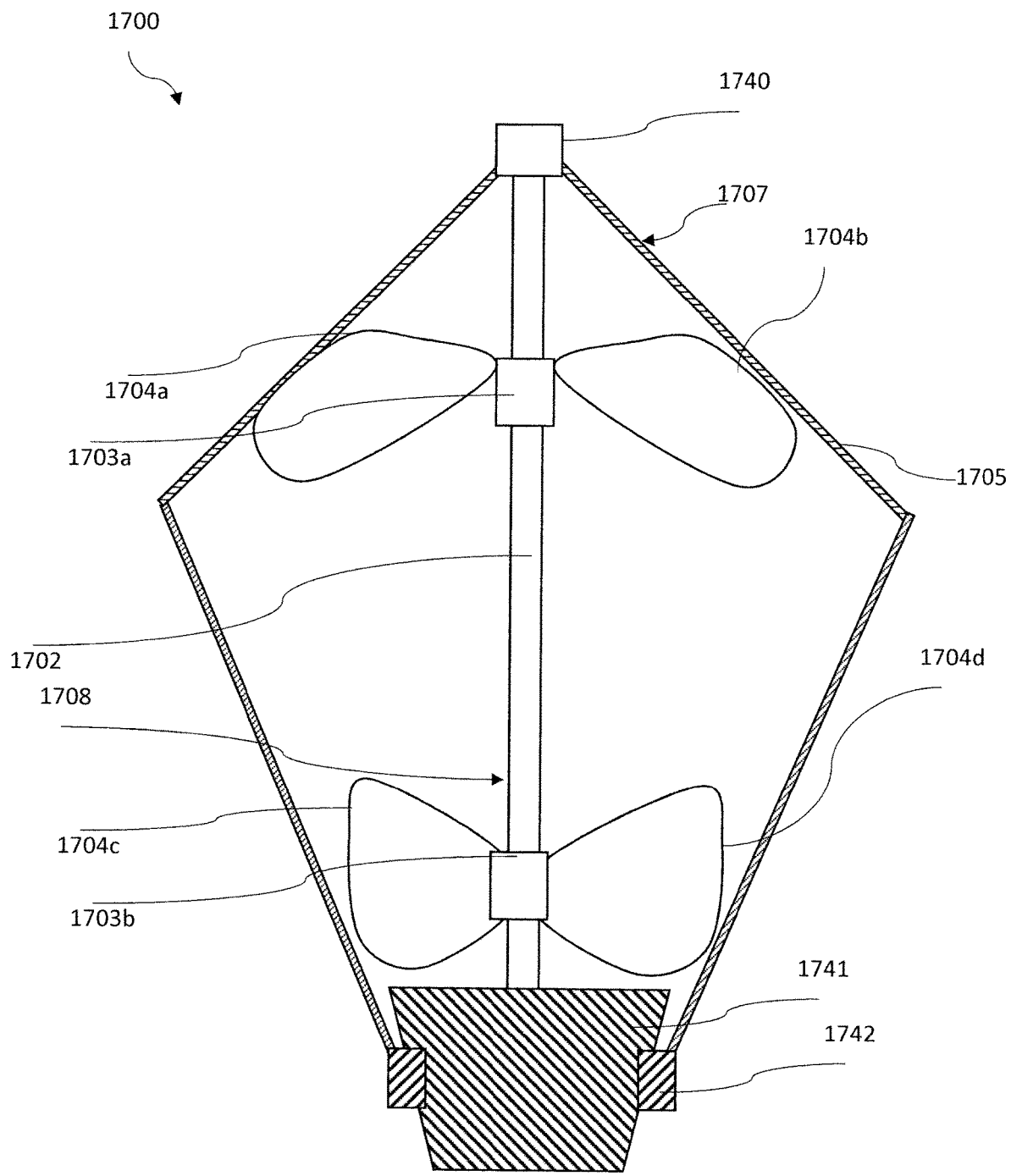
FIG. 34 is a schematic cross-sectional view of yet another embodiment of a plant cover device without the plant, according to the present disclosure.

Referring now additionally to FIG. 34, another embodiment of the plant cover device 1700 is now described. In this embodiment of the plant cover device 1700, those elements already discussed above with respect to FIG. 33 are incremented by 100 and most require no further discussion herein. This embodiment differs from the previous embodiment in that this plant cover device 1700 illustratively includes the support 1702 anchored in a pot 1741. The lowermost portion of the mesh 1707 is coupled to the pot 1741 via a coupling 1742 (e.g. zip tie, tether, wire).

Figure 35:
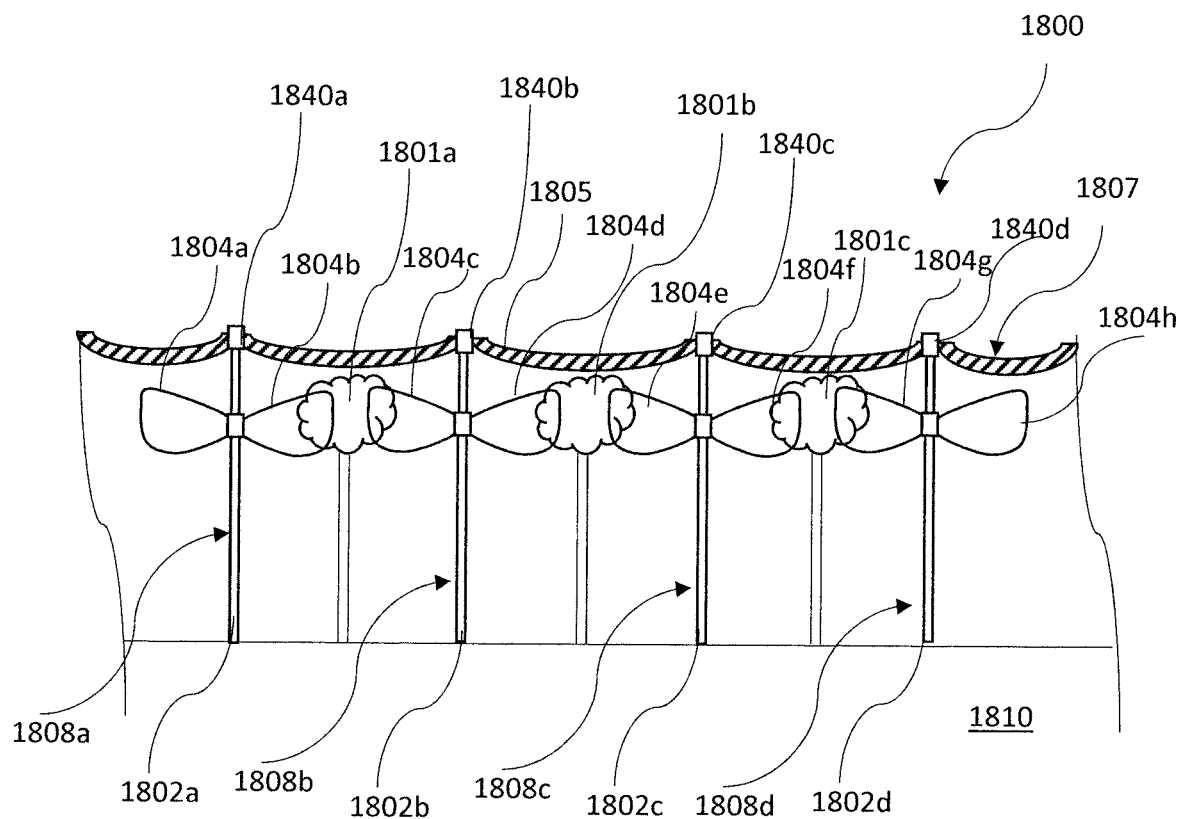
FIG. 35 is a schematic cross-sectional view of yet another embodiment of a plant cover device, according to the present disclosure.

Referring now additionally to FIG. 35, another embodiment of the plant cover device 1800 is now described. In this embodiment of the plant cover device 1800, those elements already discussed above with respect to FIG. 30 are incremented by 400 and most require no further discussion herein. This embodiment differs from the previous embodiment in that this plant cover device 1800 illustratively includes respective supports 1802*a*-1802*d* extend further upward, and respective couplings 1840*a*-1840*d* at uppermost portions of the supports for coupling the supports to the mesh 1807.

In the plant cover device 1100, 1200, 1300, 1400, 1500, 1600, 1700, 1800 embodiments of FIGS. 28-35, the support arm pairs not only support the mesh structure, but also provide support for the plants themselves. Moreover, these plant cover device 1100, 1200, 1300, 1400, 1500, 1600, 1700, 1800 embodiments can be used without the mesh 1207, 1307, 1607, 1707, 1807 and simply to support the plants.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A plant cover device comprising:
an enclosure comprising
an upper end comprising a sealed apex,
a lower tubular end opposite the upper end, and
a medial seam coupling the upper end and the lower tubular end,
the upper end comprising a plurality of panels coupled together to partially define a plant-receiving cavity therein and the sealed apex, each of the plurality of panels having a major mesh surface, and a panel seam extending along a peripheral edge of the major mesh surface, adjacent panels being coupled together at respective panel seams,
the lower tubular end comprising a major mesh surface and having a first end and a second end opposite the first end, the first end being coupled to the medial seam, the lower tubular end also partially defining the plant-receiving cavity therein, and
a curved flexible memoryless support carried by the medial seam; and
a pole extending vertically from a surface to abut the sealed apex of the enclosure.

2. The plant cover device of claim 1 wherein each of the plurality of panels comprises a pentagon-shaped panel.

3. The plant cover device of claim 1 wherein each of the plurality of panels comprises a triangle-shaped section, and a rectangle shaped section coupled to the triangle-shaped section, the respective triangle-shaped sections of the plurality of panels defining the sealed apex of the enclosure and an uppermost portion of the plant-receiving cavity.

4. The plant cover device of claim 1 wherein the second end of the lower tubular end comprises a solid section at a lowermost end of the lower tubular end.

5. The plant cover device of claim 4 wherein the solid section is opaque to visible light radiation and waterproof.

6. The plant cover device of claim 1 wherein the second end of the lower tubular end comprises a drawstring coupled at a lowermost end of the lower tubular end.

7. The plant cover device of claim 1 wherein the curved flexible memoryless support comprises a loop-shaped support.

8. The plant cover device of claim 1 wherein the curved flexible memoryless support comprises a single piece flexible rod.

9. The plant cover device of claim 1 wherein the medial seam comprises an annular sleeve; and wherein the curved flexible memoryless support is carried within the annular sleeve.

10. The plant cover device of claim 1 wherein each mesh surface comprises a plurality of mesh openings, each opening having a diameter of less than 300 μm.

11. A plant cover assembly comprising:
a plant;
a pole extending vertically from a surface adjacent the plant; and
an enclosure to be positioned over the pole and the plant, the enclosure comprising
an upper end comprising a sealed apex, the pole to abut the sealed apex,
a lower tubular end opposite the upper end, and
a medial seam coupling the upper end and the lower tubular end and comprising an annular sleeve,
the upper end comprising a plurality of pentagon-shaped panels coupled together to partially define a plant-receiving cavity therein and the sealed apex, each of the plurality of pentagon-shaped panels having a major mesh surface, and a panel seam extending along a peripheral edge of the major mesh surface, adjacent pentagon-shaped panels being coupled together at respective panel seams,
the lower tubular end comprising a major mesh surface and having a first end and a second end opposite the first end, the first end being coupled to the medial seam, the lower tubular end also partially defining the plant-receiving cavity therein,
the second end of the lower tubular end comprising
a solid section at a lowermost end of the lower tubular end, and
a drawstring coupling the solid section to a trunk of the plant, sealing in the plant-receiving cavity, and
a curved flexible memoryless support carried within the annular sleeve of the medial seam.

12. The plant cover assembly of claim 11 wherein each of the plurality of pentagon-shaped panels comprises a triangle-shaped section, and a rectangle shaped section coupled to the triangle-shaped section, the respective triangle-shaped sections of the plurality of pentagon-shaped panels defining the sealed apex of the enclosure and an uppermost portion of the plant-receiving cavity.

13. The plant cover assembly of claim 11 wherein the solid section is opaque to visible light radiation and waterproof.

14. The plant cover assembly of claim 11 wherein the second end of the lower tubular end comprises a drawstring coupled at a lowermost end of the lower tubular end.

15. The plant cover assembly of claim 11 wherein the curved flexible memoryless support comprises a loop-shaped support.

16. The plant cover assembly of claim 11 wherein the curved flexible memoryless support comprises a single piece flexible rod.

17. The plant cover assembly of claim 11 wherein each mesh surface comprises a plurality of mesh openings, each opening having a diameter of less than 300 μm.

18. A method of making a plant cover device comprising:
forming an enclosure comprising
an upper end comprising a sealed apex,
a lower tubular end opposite the upper end, and
a medial seam coupling the upper end and the lower tubular end,
the upper end comprising a plurality of panels coupled together to partially define a plant-receiving cavity therein and the sealed apex, each of the plurality of panels having a major mesh surface, and a panel seam extending along a peripheral edge of the major mesh surface, adjacent panels being coupled together at respective panel seams,
the lower tubular end comprising a major mesh surface and having a first end and a second end opposite the first end, the first end being coupled to the medial seam, the lower tubular end also partially defining the plant-receiving cavity therein, and
a curved flexible memoryless support carried by the medial seam; and
providing a pole to extend vertically from a surface to abut the sealed apex of the enclosure.

19. The method of claim 18 wherein each of the plurality of panels comprises a pentagon-shaped panel.

20. The method of claim 18 wherein each of the plurality of panels comprises a triangle-shaped section, and a rectangle shaped section coupled to the triangle-shaped section, the respective triangle-shaped sections of the plurality of panels defining the sealed apex of the enclosure and an uppermost portion of the plant-receiving cavity.

\* \* \* \* \*